United States Patent
Kachi

(10) Patent No.: US 10,170,751 B2
(45) Date of Patent: Jan. 1, 2019

(54) COMPOSITE ACTIVE MATERIAL FOR LITHIUM SECONDARY BATTERIES AND METHOD FOR PRODUCING SAME

(75) Inventor: Naoyoshi Kachi, Osaka (JP)

(73) Assignee: CONNEXX SYSTEMS CORPORATION, Kyoto (JP)

( * ) Notice: Subject to any disclaimer, the term of this patent is extended or adjusted under 35 U.S.C. 154(b) by 1019 days.

(21) Appl. No.: 14/240,672

(22) PCT Filed: Aug. 10, 2012

(86) PCT No.: PCT/JP2012/070942
§ 371 (c)(1),
(2), (4) Date: Apr. 21, 2014

(87) PCT Pub. No.: WO2013/027686
PCT Pub. Date: Feb. 28, 2013

(65) Prior Publication Data
US 2014/0227600 A1  Aug. 14, 2014

(30) Foreign Application Priority Data
Aug. 22, 2011  (JP) .................................. 2011-180041

(51) Int. Cl.
*H01M 4/36* (2006.01)
*H01M 4/38* (2006.01)
(Continued)

(52) U.S. Cl.
CPC ............. *H01M 4/364* (2013.01); *H01M 4/38* (2013.01); *H01M 4/587* (2013.01); *C01B 32/20* (2017.08);
(Continued)

(58) Field of Classification Search
None
See application file for complete search history.

(56) References Cited

U.S. PATENT DOCUMENTS

| | | | |
|---|---|---|---|
| 2003/0104270 A1 | 6/2003 | Rubino et al. | |
| 2009/0117466 A1* | 5/2009 | Zhamu | H01M 4/02 429/231.8 |
| 2010/0273058 A1 | 10/2010 | Lee et al. | |

FOREIGN PATENT DOCUMENTS

| | | |
|---|---|---|
| EP | 1 205 989 A2 | 5/2002 |
| JP | 2003242965 A | 8/2003 |

(Continued)

OTHER PUBLICATIONS

Machine translation of WO2007/148553 printed Jun. 25, 2017.*

*Primary Examiner* — Maria Laios
(74) *Attorney, Agent, or Firm* — Muncy, Geissler, Olds & Lowe, P.C.

(57) ABSTRACT

The purpose of the present invention is to provide: a composite active material for lithium secondary batteries, which is capable of providing a lithium secondary battery that has large charge and discharge capacity, high-rate charge and discharge characteristics and good cycle characteristics at the same time; and a method for producing the composite active material for lithium secondary batteries. A method of producing a composite active material for lithium secondary batteries of the present invention comprises: a mixing step wherein graphite having a specific surface area of 30 m²/g or more and a battery active material that is capable of combining with lithium ions are mixed with each other, thereby obtaining a mixture; and a spheroidizing step wherein the mixture is subjected to a spheroidization treatment, thereby producing a generally spherical composite active material for lithium secondary batteries, said composite active material containing graphite and the battery active material that is capable of combining with lithium ions.

7 Claims, 14 Drawing Sheets

(51) Int. Cl.
*H01M 4/587* (2010.01)
*H01M 10/052* (2010.01)
*C01B 32/20* (2017.01)

(52) U.S. Cl.
CPC ............ *H01M 4/386* (2013.01); *H01M 4/387* (2013.01); *H01M 10/052* (2013.01)

(56) References Cited

FOREIGN PATENT DOCUMENTS

| | | | |
|---|---|---|---|
| JP | 2005-310760 A | 11/2005 | |
| JP | 2007-141573 A | 6/2007 | |
| JP | 2008-027897 | 2/2008 | |
| JP | 2010-282942 A | 12/2010 | |
| KR | 20070113066 A | 11/2007 | |
| WO | WO 2005/031898 A1 | 4/2005 | |
| WO | WO 2007/148553 * | 6/2007 | ............ H01M 4/36 |
| WO | WO 2011/084817 A1 | 7/2011 | |

* cited by examiner

COMPOSITE ACTIVE MATERIAL FOR LITHIUM SECONDARY BATTERIES AND METHOD FOR PRODUCING SAME

TECHNICAL FIELD

The present invention relates to a composite active material for lithium secondary batteries and a method for producing the same.

BACKGROUND ART

With reduction in size and weight of electronic materials, and progress of the development of HEV and EV, requests for batteries having large capacity, high-speed charge and discharge characteristics, good cycle characteristics, and excellent safety are increasing. Among them, lithium ion secondary batteries (lithium secondary batteries) have attracted attention as the most promising battery.

However, as the premises for developing a lithium secondary battery exhibiting excellent performances, negative electrode materials, positive electrode materials, electrolytes, separators, current collectors and the like having high performances must be developed, and a battery sufficiently utilizing their characteristics must be designed.

In particular, negative electrode materials determine the basic battery characteristics, thus materials with improved characteristics such as charge-discharge capacity have been actively developed. More specifically, while the conventional negative electrode material mainly used a carbon material such as graphite powder whose theoretical electric capacity of graphite is 372 mAh/g, a combined use with other materials with theoretical electric capacities higher than graphite (for example, silicon, tin, aluminum, and the like) has been attempted, in order to obtain the higher charge-discharge capacity.

For example, Patent Literature 1 discloses a composite material of graphite and Si obtained by mixing flake graphite and silicon powder and pulverizing and granulating the mixture in a high-speed air stream. In Patent Literature 1, it is described that the specific surface area of the graphite material is preferably 0.5 to 20 m²/g or so, and graphite having a specific surface area within the above range is used in the section of Examples. In addition, Patent Literature 2 discloses a material obtained by mixing exfoliated graphite flakes and a metal such as tin.

CITATION LIST

Patent Literature

Patent Literature 1: JP 2008-27897 A
Patent Literature 2: US 2009/0117466 A

SUMMARY OF INVENTION

Technical Problems

As described above, in recent years, requests for the improved characteristics of battery materials are greatly increasing and, for example, the required levels for not only charge-discharge capacity, but also cycle characteristics are greatly rising.

The present inventors have studied performances of lithium secondary batteries using the materials (composite active material) described in Patent Literatures 1 and 2 described above, and in the studies, rapid capacity deteriorations have been consequently observed after several cycles or several tens of cycles in both lithium secondary batteries using those materials. Thus further improvement was required. This is probably because the battery active material that is capable of combining with lithium ions such as Si, for example, is refined with the progress of the cycles, and loses electron conductivity due to delamination from the material or the like.

In consideration of the above actual circumstances, an object of the present invention is to provide a composite active material for lithium secondary batteries capable of preparing a lithium secondary battery having large charge-discharge capacity, high-speed charge and discharge characteristics, and good cycle characteristics, and a method for producing the same.

In addition, an object of the present invention is to provide a battery using the composite active material for lithium secondary batteries.

Solution to Problems

As a result of intensive studies on the prior art, the present inventors have found that an insufficient adhesion between the battery active material and the graphite is a problem, and have found that the problem can be solved by the following constitution.

(1) A method for producing a composite active material for lithium secondary batteries including:

a mixing step of mixing graphite having a specific surface area of 30 m²/g or more and a battery active material capable of combining with lithium ions, to obtain a mixture; and a spheroidization step of subjecting the mixture to a spheroidization treatment, to produce a generally spherical composite active material for lithium secondary batteries, the composite active material containing graphite and a battery active material capable of combining with lithium ions.

(2) The method for producing a composite active material for lithium secondary batteries according to (1), wherein the graphite is an expanded graphite.

(3) The method for producing a composite active material for lithium secondary batteries according to (1) or (2), wherein the battery active material capable of combining with lithium ions contains at least one element selected from the group consisting of silicon, tin, aluminum, antimony, and indium.

(4) The method for producing a composite active material for lithium secondary batteries according to any of (1) to (3), wherein the spheroidization step is performed by a high-speed rotary impact pulverizer selected from the group consisting of hammer mills, pin mills, screen mills, turbo type mills, centrifugal type mills, and sample mills.

(5) The method for producing a composite active material for lithium secondary batteries according to any of (1) to (4), wherein the battery active material capable of combining with lithium ions has an average particle diameter of 1 µm or less.

(6) A generally spherical composite active material for lithium secondary batteries containing graphite and a battery active material capable of combining with lithium ions, wherein the area ratio of the graphite exposed to the surface of the composite active material for lithium secondary batteries observed by scanning electron microscope (SEM) observation at an accelerating voltage of 10 kV or less is 95% or more.

(7) The composite active material for lithium secondary batteries according to (6), wherein the tap density is 0.8 g/cm$^3$ or more.

(8) The composite active material for lithium secondary batteries according to (6) or (7), wherein the specific surface area is 5 to 100 m$^2$/g.

(9) The composite active material for lithium secondary batteries according to any of (5) to (7), wherein the battery active material capable of combining with lithium ions has an average particle diameter of 1 μm or less.

(10) The composite active material for lithium secondary batteries according to any of (6) to (9), wherein a part of the battery active material capable of combining with lithium ions is present in the form of secondary particle that is an aggregate of the battery active material capable of combining with lithium ions, and the secondary particle has an average diameter of 5 μm or less.

(11) A lithium secondary battery including the composite active material for lithium secondary batteries as defined in any of (6) to (10).

(12) The lithium secondary battery according to (11), wherein the lithium secondary battery is used in a state that the battery active material capable of combining with lithium ions is charged 60% or more and the graphite is charged 50% or less, in a fully charged state.

(13) The lithium secondary battery according to (11) or (12), including a negative electrode containing the composite active material for lithium secondary batteries as defined in any of (6) to (10), wherein
the lithium secondary battery is used in a range where the potential of the negative electrode does not fall below 0.4 V with respect to a lithium reference electrode.

(14) A lithium secondary battery including a current collector having a three-dimensional structure and an electrode containing the composite active material for lithium secondary batteries as defined in any of (6) to (10) disposed thereon.

Advantageous Effects of Invention

According to the present invention, a composite active material for lithium secondary batteries capable of preparing a lithium secondary battery having large charge-discharge capacity, high-speed charge and discharge characteristics, and good cycle characteristics at the same time, and a method for producing the same can be provided.

In addition, according to the present invention, a battery using the composite active material for lithium secondary batteries can be provided.

DESCRIPTION OF EMBODIMENTS

Figure 1A:
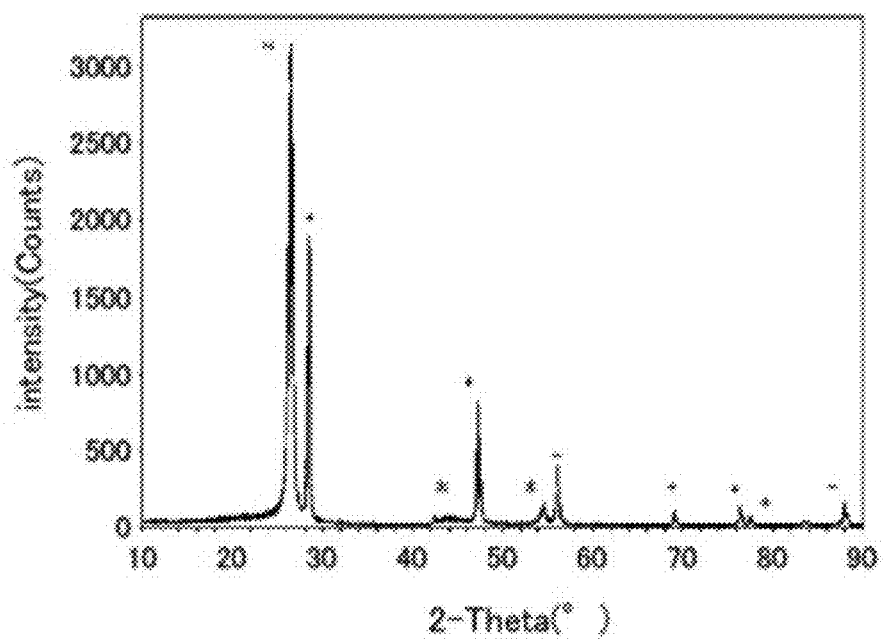
FIG. 1(A) is an XRD diffraction pattern (*: peaks derived from expanded graphite, +: peaks derived from Si) of a composite active material for lithium secondary batteries prepared in Example 1.

Hereinbelow, the composite active material for lithium secondary batteries of the present invention and the method for producing the same will be described in detail.

First, features of the present invention compared to the prior art will be described in detail.

One of the features of the production method of the present invention can be that a mixture of graphite having a predetermined specific surface area and a battery active material capable of combining with lithium ions is subjected to a spheroidization treatment. More specifically, first, by utilizing huge space or surface area of the graphite having a predetermined specific surface area such as an expanded graphite and a thinned graphite (flaky graphite), a battery active material (preferably, a microparticulated battery active material) is highly uniformly dispersed on the surface of the graphite. Thereafter, the mixture of the obtained battery active material and the graphite is subjected to a spheroidization treatment, whereby the adhesion of the battery active material to the graphite, on the basis of the strong interaction between the AB planes of the graphite, can be enhanced. The composite active material for lithium secondary batteries obtained by the above procedures has a structure in which the battery active material is wrapped within a graphite sheet having a very thin thickness and a large specific surface area. Accordingly, the composite active material for lithium secondary batteries of the present invention has incomparably improved contact and adhesion between the graphite and the battery active material, as compared to the conventional composite active material for lithium secondary batteries. As a result, it becomes possible to impart high conductivity to the battery active material, and avoid the loss of the conductive path due to the pulverization of the battery active material with charge-discharge cycles, and it is consequently possible to improve cycle characteristics of the lithium secondary battery.

In addition, conventionally, in a composite active material for lithium secondary batteries composed of graphite and a battery active material, expansion relief space has been intentionally provided in the composite active material to mitigate volume expansion and contraction of the battery active material. However, in the composite active material for lithium secondary batteries of the present invention, graphite and a battery active material are dispersed as highly as possible and further pressed based on the exactly opposite idea, thereby confining expansion of the battery active material in the solid AB planes of the graphite, maintaining conductivity and suppressing deformation of the composite active material.

Furthermore, even when a battery active material is subjected to physical deformations such as finely pulverization with charge-discharge cycles, the battery active material is maintained in a state of being sandwiched between the graphite layers the distance between which can be flexibly adjusted, thus conductivity of the battery active material can be maintained.

Moreover, by using a molding material obtained by spheroidizing the composite active material for lithium secondary batteries of the present invention, delamination of the pulverized battery active material from the layer of flaky graphite can be suppressed. Alternatively, for the composite active material for lithium secondary batteries obtained by being subjected to spheroidization treatment has a structure in which a graphite edge is substantially not exposed to the outer surface due to spheroidization. Furthermore, as necessary, it is possible to have an edgeless structure in which the battery active material or graphite edge is not exposed to the surface of the composite active material for lithium secondary batteries due to the coating of CVD carbon on its surface. The composite active material for lithium secondary batteries having the above structure exhibits more excellent safety.

The characteristics representing the structural features of the composite active material for lithium secondary batteries of the present invention include that its shape is generally spherical, and when the secondary electron image of the composite active material for lithium secondary batteries of the present invention is observed using a scanning electron microscope at a low accelerating voltage of 10 kV or less, the area ratio of the graphite exposed to the surface of the composite active material for lithium secondary batteries is 95% or more. That is, the battery active material is substantially included within the composite active material. Further, in the secondary electron image, it is possible to directly observe, through a thin graphite layer, the battery active material that is included as being sandwiched between the graphite layers.

Further, in X-ray diffraction, a peak due to an intercalation compound intercalated between the graphite layers is hardly observed, and it can be seen that this composite active material is composed of a mechanical mixture of graphite and a battery active material. A small particle of a battery active material is wrapped by a thin graphite sheet as described above, thereby achieving high dispersion of the battery active material and dense adhesion between the graphite sheets. As a result, a large battery capacity can be generated from intrinsically non-conductive or low conductive battery active material, and furthermore, by utilizing the characteristics that the diffusion distance of lithium ions in the material due to a fine battery active material is short, a composite active material for lithium secondary batteries that can prepare a lithium secondary battery having extremely high charge-discharge rate characteristics and good cycle characteristics can be provided.

First, the method for producing a composite active material for lithium secondary batteries of the present invention will be described in detail, and then embodiments of the produced composite active material for lithium secondary batteries will be described in detail.

The method for producing a composite active material for lithium secondary batteries of the present invention includes a mixing step of predetermined graphite and a battery active material capable of combining with lithium ions and a spheroidization step of subjecting the obtained mixture to a spheroidization treatment.

Hereinbelow, the used materials and procedures thereof will be described in detail by each step.

<Mixing Step>

A mixing step is a step of mixing graphite having a specific surface area of 30 $m^2$/g or more and a battery active material capable of combining with lithium ions (hereinafter, also simply referred to as a battery active material), to obtain a mixture. This step is carried out, whereby the battery active material is uniformly mixed to the extremely large graphite surface, and a mixture in which the battery active material is extremely highly dispersed can be obtained. As described below, since graphite has a large area, the battery active material dispersed and adhered on the graphite surface in the mixture is wrapped up (in other words, contained) between the graphite in a manner being sandwiched by the graphite only by applying small pressure to the graphite.

First, the materials (graphite, battery active material, and the like.) used in this step will be described in detail, and then the procedures of this step will be described in detail.

(Graphite)

The graphite used in this step shows a specific surface area of 30 m$^2$/g or more. In the above range, a composite active material for lithium secondary batteries in which the battery active material is highly dispersed on the graphite surface of a high surface area (preferably with a thin thickness) is obtained. As a result, a battery material using the composite active material for lithium secondary batteries of the present invention shows large charge-discharge capacity and good cycle characteristics. Among them, the specific surface area is preferably 40 m$^2$/g or more and more preferably 60 m$^2$/g or more, in that cycle characteristics of a lithium secondary battery using the composite active material are more excellent. The upper limit is not particularly limited, but a specific surface area of 200 m$^2$/g or less is preferred in that the production procedure is complicated, and synthesis is difficult.

In a specific surface area of the graphite of less than 30 m$^2$/g, mixing of the graphite and the battery active material is nonuniform, and falling off of the battery active material and exposure of the battery active material to the surface of a molded composite become more significant when molding, consequently, a lithium secondary battery using the composite active material for lithium secondary batteries had deteriorated performances in charging and discharging capacity and cycle characteristics.

Here, the specific surface area of graphite is measured using BET method with nitrogen adsorption (JIS Z 8830, one-point method).

In the graphite, a layer in which a plurality of graphene sheets is stacked in the direction of stacking the graphite surface is contained, and the graphene sheets are mainly held together by van der Waals forces.

The average thickness of the layer of the laminated graphene sheets contained in the graphite showing the predetermined specific surface area is preferably 29 nm or less and more preferably 22 nm or less, in that the charge-discharge capacity and cycle characteristic of the lithium secondary battery using the composite active material for lithium secondary batteries are more excellent. The lower limit is not particularly limited, but the average thickness is generally 4.4 nm or more since the production procedure is complicated.

Incidentally, it is said in general that the thickness of a single graphene sheet is as thin as 0.34 nm, and when the average thickness is thinner than 18 nm, the specific surface area is calculated as larger than about 50 m$^2$/g. In addition, a graphene single sheet has a theoretical value of the specific surface area reaching 2630 m$^2$/g.

Incidentally, as the method of measuring the average thickness, graphite is observed by electron microscope observation (TEM), and 10 or more of the thickness of the layers of the laminated graphene sheets in the graphite are measured, then the arithmetic mean of these values is calculated, thereby obtaining an average thickness.

The lower limit of the bulk density of the used graphite is not particularly limited, but is preferably 0.01 g/cm$^3$ or more and more preferably 0.02 g/cm$^2$ or more, in that more uniform and higher dispersion of the battery active material to the graphite is made. The upper limit is 0.05 g/cm$^2$ or less in many case, due to manufacturing problems.

Incidentally, as the method of measuring the bulk density, a sample is inserted so as not to compress the sample in a 500 ml glass measuring cylinder, and the sample weight is divided by the sample volume to obtain a bulk density.

The graphite used in this step may be a commercially available product, or may be produced by a known method.

As the graphite, a so-called expanded graphite or flaky graphite can be used.

As the method for producing an expanded graphite, it can be produced by, for example, graphite (for example, flake graphite) is immersed in an acid at room temperature, thereafter, the obtained acid treated graphite is subjected to heat treatment (preferably, treated at 700 to 1000° C.). More specifically, a flake natural graphite is immersed in a mixed acid of 9 parts by weight of sulfuric acid and 1 part by weight of nitric acid for about 1 hour, then the acid is removed, and the graphite is washed with water and dried. Thereafter, the obtained acid treated graphite is charged into a furnace at about 850° C., thereby obtaining an expanded graphite. Incidentally, an expanded graphite can be also obtained by using graphite forming an intercalation compound of an alkali metal or the like with graphite, instead of the acid treated graphite.

The bulk density of the acid treated graphite obtained above is not particularly limited, but is preferably 0.6 g/cm$^3$ or more and more preferably 0.7 g/cm$^3$ or more, in that the acid treated graphite is sufficiently expanded. The upper limit is not particularly limited, but is 1.0 g/cm$^3$ or less in many cases, due to manufacturing problems.

Incidentally, as the method of measuring the bulk density, a sample is inserted so as not to compress the sample in a 100 ml glass measuring cylinder, and the sample weight is divided by the sample volume to obtain a bulk density.

In addition, as the method for producing a flaky graphite, the expanded graphite is dispersed in a solvent, then treated with a pulverizer that applies ultrasonic treatment or a high shear stress (for example, stone mill) or the like, whereby the hinge portion of the expanded graphite is damaged, and a flaky graphite in which about fifty graphene sheets (preferably, 10 to 150 sheets) are laminated can be obtained.

Incidentally, the number of the graphene sheets that constitute the expanded graphite showing the specific surface area, and the number of the graphene sheets that constitute the flaky graphite obtained by pulverizing them, are estimated to be basically almost the same.

(Battery Active Material)

The battery active material used in this step is a battery active material compound (preferably, the negative electrode active material) capable of combining with lithium ions. In other words, the battery active material may be any material (for example, metals, carbides, nitrides and oxides of metals, or the like) that can combine with lithium ions and occlude and release lithium ions. For example, the battery active material is a metal or non-metal capable of absorbing and discharging lithium ions or a metal oxide capable of alloying with lithium.

More specifically, examples include metals such as Si, Sn, Al, Sb, Zn, Bi, Cd, Pb, In, Ag, Ga, and Ge (metals capable of alloying with lithium) or alloys containing these metals (for example, Si alloys, Sb alloys, Sn alloys, and In alloys), metal oxides such as SnO and SnO$_2$ (metal oxides capable of alloying with lithium) or the like. Among them, the battery active material preferably contains at least one element selected from the group consisting of Si, Sn, Al, Sb, and In, and more preferably contains elements of Si and Sn, in that the discharge capacity and cycle characteristics of the lithium secondary battery obtained by using the obtained composite active material for lithium secondary batteries are more excellent.

Incidentally, the alloy may be an alloy containing a metal that does not occlude and release lithium ions, other than an alloy made of the metal combination described above. In this case, it is preferred if the content of the metal capable of alloying with lithium in the alloy is higher. Judging from uniformity and cycle characteristics of the particles determined by the secondary electron image obtained by SEM observation, the upper limit of the metal content is preferably 70% by mass and more preferably 60% by mass or less.

The shape of the used battery active material is not particularly limited, and any shapes such as powder, plate-like, granular, fibrous, bulk, and spherical can be used.

The average particle diameter of the used battery active material is preferably 1 μm or less, more preferably 0.5 μm or less, and further preferably 0.1 μm or less, in that falling off of the battery active material upon complexation of graphite with the battery active material and expansion failure of the battery active material with cycles and the like are further suppressed. The lower limit value is not particularly limited, and the smaller is preferable. In the usual pulverization method, it is possible to produce a fine powder to an average particle diameter of about 0.01 μm, and a powder having a particle diameter in this range can be effectively used.

Incidentally, as the method of measuring the average particle diameter, a laser diffraction-type particle size distribution analyzer is used. More specifically, D50: 50% volume particle diameter is defined as an average particle diameter.

Figure 11:
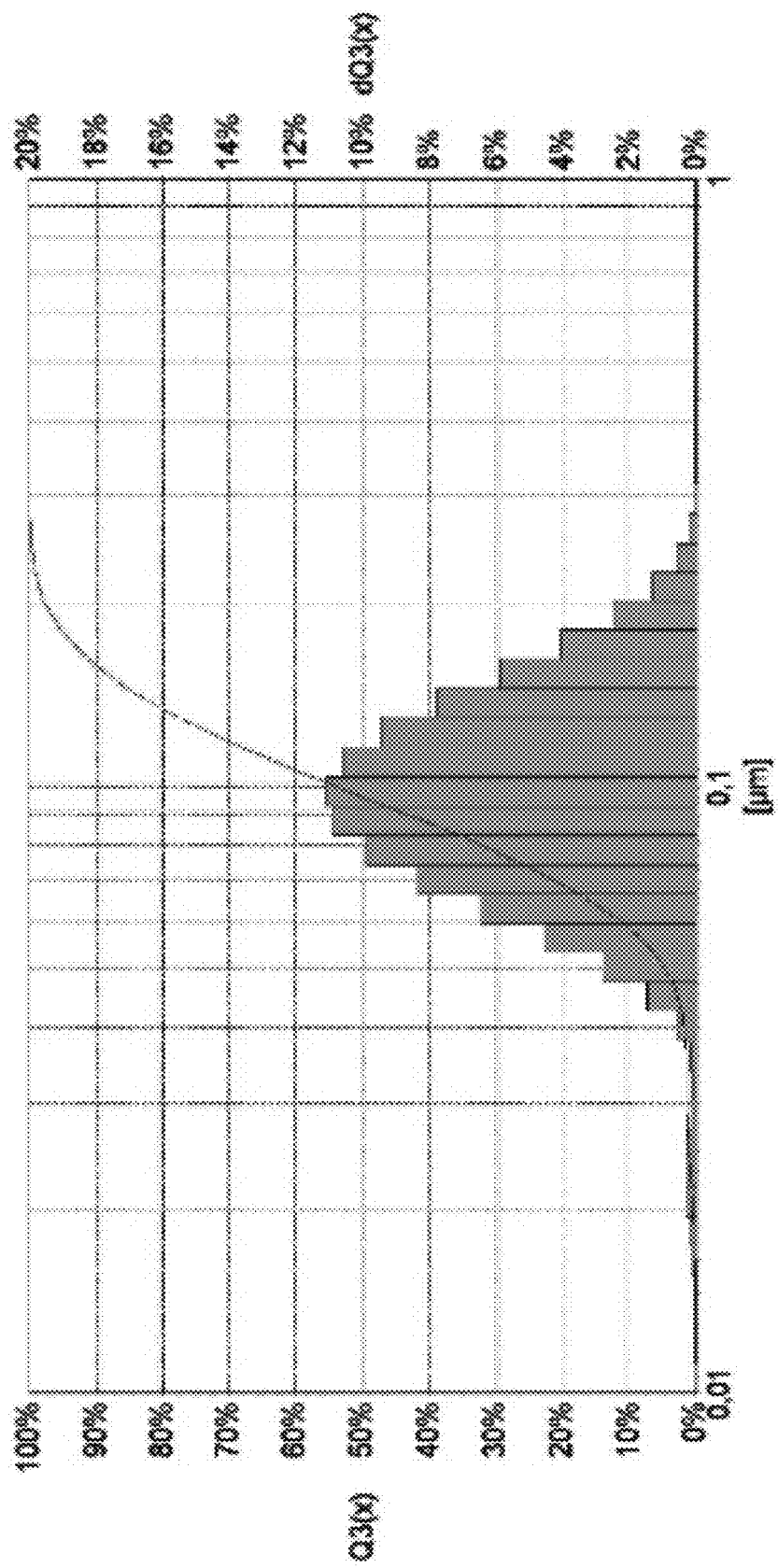
FIG. 11 is a diagram showing a measurement result of a particle size distribution of the battery active material using a laser diffraction-type particle size distribution analyzer.

As the method for obtaining a battery active material having the predetermined average particle diameter described above, it is possible to pulverize the battery active material using a known apparatus such as a stirred tank stirring mill (bead mill, and the like), thereby obtaining the powder with small particle diameter described above. In FIG. 11, the result of measuring the particle size distribution of the battery active material pulverized with a bead mill by a laser diffraction-type particle size distribution analyzer is shown as an example. Based on this result, D50: 50% volume particle diameter, that is, average particle diameter was 0.096 μm. This result indicates that it is possible to obtain a battery active material having the predetermined average particle diameter by using a bead mill.

(Procedures of Steps)

The method of mixing graphite and a battery active material as described above is not particularly limited, and a known method can be used, and examples include so called dry treatment, wet treatment or the like. Here, embodiment of the wet treatment is preferred, in that the graphite and the battery active material are more uniformly mixed in the obtained mixture.

As the dry treatment, for example, there is a method of adding the graphite and the battery active material described above to a known stirrer (for example, Henschel mixer), and mixing the mixture.

Examples of the wet treatment include a method of dispersing the graphite and the battery active material described above in a solvent and mixing and stirring the obtained solution, and removing the solvent.

The type of the solvent used in the wet treatment is not particularly limited, and may be a solvent capable of dispersing graphite and a battery active material. Examples include alcohol solvents (for example, methanol, ethanol, isopropanol), ketone solvents (such as acetone, methyl ethyl ketone, cyclohexanone), amide solvents (for example, formamide, dimethylacetamide, N-methylpyrrolidone, N-ethyl pyrrolidone), nitrile solvents (for example, acetonitrile, propionitrile), ester solvents (for example, methyl acetate, ethyl acetate), carbonate solvents (for example, dimethyl carbonate, diethyl carbonate), ether solvents (for example, cellosolve), halogenated solvents and mixtures of water and mixtures thereof, and the like.

Among them, alcohol solvents are preferable, in that cycle characteristics of a lithium secondary battery using the obtained composite active material for lithium secondary battery is more excellent.

In the wet treatment, conditions of mixing and stirring the graphite and the battery active material is not particularly limited, and the optimum conditions are appropriately selected depending on the used materials. As the stirring time, about 1 to 2 hours are usually preferable, in that the graphite and the battery active material are more uniformly dispersed, and consequently the cycle characteristics of a lithium secondary battery using the obtained composite active material for lithium secondary batteries are more excellent.

In addition, as necessary, ultrasonic wave may be added in stirring treatment.

The method of removing the solvent is not particularly limited, and includes methods using a known device (for example, an evaporator) and the like.

The mixing ratio of the graphite and the battery active material is not particularly limited, and the battery active material is preferably mixed in an amount of 10 to 230 parts by mass and is more preferably mixed in an amount of 40 to 150 parts by mass, based on 100 parts by mass of the graphite, in that the cycle characteristics of a lithium secondary battery using the obtained composite active material for lithium secondary batteries are more excellent.

Also, the amount of the solvent used is not particularly limited, and the solvent is preferably mixed in an amount of 3000 to 15000 parts by mass and is more preferably mixed in an amount of 5000 to 7000 parts by mass, based on 100 parts by mass of the graphite, in that the cycle characteristics of a lithium secondary battery using the obtained composite active material for lithium secondary batteries are more excellent, as a result of achieving higher dispersion.

<Spheroidization Step>

Spheroidization step is a step of subjecting the mixture to a spheroidization treatment, to produce a generally spherical composite active material for lithium secondary batteries, the composite active material containing graphite and the battery active material capable of combining with lithium ions.

By carrying out this step, sheets of the graphite are folded so as to incorporate the battery active material therein, to be spheroidized. At that time, the edge portion of the graphite is folded inside to obtain the structure which is not substantially exposed to the surface of the formed composite active material for lithium secondary batteries.

Hereinafter, differences in mechanism in the spheroidization steps between the case of using the flake graphite and the case of using the graphite having a large specific surface area (expanded graphite or flaky graphite) will be described in detail.

For example, as described in JP 2008-27897 A, when flake graphite and a battery active material are placed in a high speed air stream, the longitudinal direction of the graphite, that is, the AB plane of the graphite is arranged in the direction of the air flow and collides with a pin or a collision plate disposed perpendicularly to the air flow, and the AB plane of the graphite is compressed and deformed, and consequently spheroidizes in the form of sandwiching the battery active material. In this case, many of the battery active material present in the graphite surface separate from the graphite surface by impact at the collision, and only the battery active material in a state of incidentally being sandwiched between the AB planes of the graphite is interposed between the graphite layers.

Meanwhile, in the present invention, for example, when the used graphite having a large specific surface area is an expanded graphite, the long axis of the expanded graphite is the C-axis direction of the graphite, and when the graphite is placed in the high-speed air flow, the C-axis of the graphite is arranged in the air flow direction, and the graphite collides with the pin or the collision plate. As a result, the C-axis of the graphite is compressed, and the graphite changes to a state close to the form before expansion. This means that the battery active material adhered to the AB plane of the graphite is crushed by the graphite, and the battery active material is completely sandwiched between the graphite layers. The graphite once compressed in the C-axis direction changes to the structure in which the AB plane is the long axis, and then changes to a spherical molded body in which the AB plane of the graphite is folded.

In addition, in the case of flaky graphite, the graphite simultaneously receives compression in the parallel direction and compression in the vertical direction to the AB plane of the graphite, but because the elastic modulus of the AB plane of the graphite is low, the graphite easily adheres between the AB plane of the graphite and deformed due to compression in a perpendicular direction to the AB plane of the graphite, and the action of sandwiching the battery active material adhered to the surface of the flaky graphite in the AB plane of the graphite is preceded. Thereafter, the deformation of the AB plane of the graphite having a high elastic modulus occurs, and spheroidization proceeds.

Further, in the expanded graphite or flaky graphite, since the thickness of the layer of the laminated graphene sheet constituting it is small, it is obvious that the AB plane is easily deformed by smaller compression force in the AB plane direction.

The method of spheroidization treatment is not particularly limited, and is not particularly limited as long as it is a pulverizer that can mainly apply impact stress. Examples of the pulverizer include high-speed rotary impact pulverizers, and more specifically, a sample mill, a hammer mill, a pin mill, or the like can be used. Among them, a pin mill is preferred, in that the graphite and the battery active material are more uniformly mixed, and the cycle characteristics of a lithium secondary battery using the composite active material consequently obtained are more excellent.

The high-speed rotary impact pulverizer includes those in which a sample is allowed to crash into a rotor rotating at a high speed, to achieve refinement by the impact force, and examples include a hammer type of a hammer mill type fitted with a fixing or swinging impactor to the rotor, a rotary disk type of a pin mill type fitted with pins and an impact head to the rotating disk, an axial flow type in which a sample is pulverized while being transported to the shaft direction, an annular type that refines the particles in a narrow annular portion, and the like. More specifically, examples include hammer mills, pin mills, screen mills, turbo type mills, centrifugal type mills, and the like.

When this step is performed by the high-speed rotary impact pulverizer, it is preferred to be spheroidized at a rotational speed of usually 100 rpm or more, preferably 1500 rpm or more, and usually 20000 rpm or less. Pulverization proceeds by an excess impact force rather than spheroidization. Therefore, it is preferred that the impact rate is about 20 m/sec to 100 m/sec.

Since spheroidization treatment is treated at low impact force, unlike pulverization, it is usually preferred to perform circulation treatment in this step. The treatment time varies depending on the type and charge amount of the used pulverizer or the like, and is usually within 2 minutes, and the treatment time ends in about 10 seconds if it is a device in which a pin or a collision plate is appropriately arranged.

Further, the spheroidization treatment is preferably performed in air. When the same treatment with nitrogen gas flow is performed, there is a danger of firing when opened to atmosphere.

<Composite Active Material for Lithium Secondary Batteries>

The composite active material for lithium secondary batteries (hereinafter, also simply referred to as composite active material) obtained through the steps described above is a generally spherical and contains graphite and a battery active material.

Hereinbelow, the obtained composite active material will be described in detail.

The shape of the composite active material has a generally spherical shape by the above treatment. The generally spherical intends that the composite active material has a structure in which the composite active material is rounded, and has a shape having no sharp edge (ridge and weave) generally found in crushed particles.

More specifically, the generally spherical represents a shape of the particles of the composite active material having an aspect ratio that is the ratio of a major axis to a minor axis (major axis/minor axis) is in the range of about 1 to 3 (1 to 2 is more preferable, in that the effect of the present invention is more excellent). The aspect ratio means a value obtained by obtaining major axis/minor axis of each particle for at least 100 particles, and calculating the arithmetic mean of these values (arithmetic mean).

Here, the minor axis described above refers to a distance between two parallel lines to be the shortest distance among the combinations of the two parallel lines that contact the outside of the particles to be observed by a scanning electron microscopy or the like, and sandwich the particles. On the other hand, the major axis refers to a distance between two parallel lines to be the longest distance among the combinations of the two parallel lines in a direction perpendicular to the parallel lines determining the minor axis that contact the outside of the particles. A rectangle formed by these four lines is to be a size that the particles right fit therein.

The area ratio of the graphite exposed to the surface of the composite active material for lithium secondary batteries observed by scanning electron microscope (SEM) observation at an accelerating voltage of 10 kV or less is 95% or more. Among them, the area ratio is more preferably 98% or more, and further preferably 99% or more. The upper limit is not particularly limited, and examples include 100%. When the area ratio is within the above range, the amount of the battery active material exposed to the surface of the composite active material is small, and the composite active material is consequently excellent in cycle characteristics and the like.

When the area ratio is outside the above range (less than 95%), falling off of the battery active material is likely to occur, and the composite active material is inferior in cycle characteristics.

As a method of measuring the area ratio, at least 100 or more composite active material are observed by a scanning electron microscope (SEM) at an accelerating voltage of 10 kV or less (preferably, magnification of 2000 times or more), and the area ratio of the graphite occupied on the surface of each composite active material is measured, and the arithmetic mean of these values is calculated.

Further, the area ratio of the battery active material exposed to the surface of the composite active material for lithium secondary batteries observed by scanning electron microscope (SEM) observation at an accelerating voltage of 10 kV or less is preferably 5% or less. Among them, the area ratio is more preferably 2% or less and further preferably 1% or less. The lower limit is not particularly limited, and examples include 0%. When the area ratio is within the above range, the amount of the battery active material exposed to the surface of the composite active material is small, and the composite active material is consequently excellent in cycle characteristics and the like.

As the method of measuring the area ratio, at least 100 or more composite active material are observed by a scanning electron microscope (SEM) (preferably, magnification of 2000 times or more) at an accelerating voltage of 10 kV or less, and the area ratio of the battery active material occupied on the surface of each composite active material is measured, and the arithmetic mean of these values is calculated.

Further, as a feature of the composite active material for lithium secondary batteries, when the composite active material is observed by scanning electron microscope (SEM) observation at an accelerating voltage of 10 kV or less, it is possible to directly observe the battery active material that transmits a thin graphite layer and is contained in a state being sandwiched in the graphite layer.

Further, preferred embodiments of the composite active material for lithium secondary batteries include an embodiment in which the edge portion of the graphite is substantially not exposed to the surface. The edge portion of the graphite is not exposed to the surface, whereby the decomposition of the electrolyte solution and the destruction of the graphite that are likely to occur at the charge-discharge cycle are further suppressed, and consequently the improvement of cycle characteristics is provided.

The preferred embodiment of the composite active material for lithium secondary batteries of the present invention includes an embodiment in which the part of the battery active material capable of combining with lithium ions is present in the form of secondary particles that is an aggregate of the battery active material capable of combining with lithium ions (in other words, the battery active material capable of combining with lithium ions is present in the form of primary particle and secondary particle that is an aggregate thereof), and the secondary particle has an average diameter of 5 μm or less, and preferably 2 μm or less. Here, the lower limit of the average diameter of the secondary particles is not particularly limited, but is usually often 0.3 μm or less. The average diameter of the secondary particles is obtained by observing at least 100 or more secondary particles observed in the cross section of the composite active material for lithium secondary batteries observed by scanning electron microscope (SEM) observation, and calculating a circle equivalent diameter of each secondary particle by image analysis. The circle equivalent diameter refers to a diameter of the circle when assuming the shape of the object as a circle having the same projected area as the projected area of the object.

As the method of observing the cross section of the composite active material for lithium secondary batteries, for example, there is a method such that the composite active material is cured with a resin for fixing a microscope sample, then polishing with one or more sandpapers are repeated (when using plural types of sandpapers, the sandpapers are used in the order of coarse), then subjected to polishing with No. 2000 sandpaper and then polished with 0.5 μm alumina polishing agent, and finally polished with 0.02 μm diamond paste, thereby exposing the cross section of the composite active material, then, the cross section of the composite active material is made conductive by sputtering, and the like.

Further, determination of whether or not it is secondary particles is determined by whether or not primary particles observed in the cross section of the composite active material for lithium secondary batteries observed by scanning electron microscope (SEM) observation at an accelerating voltage of 10 kV or less are in contact with other primary particles even a part thereof. Namely, it is determined that it corresponds to the secondary particles when primary particles are in contact with other primary particles even a part thereof.

The content of the battery active material in the composite active material can be appropriately adjusted depending on the contents of the graphite and the battery active material in the mixing step described above.

Among them, the content of the battery active material is preferably 10% by mass or more, more preferably 20% by mass or more, and particularly preferably 30% by mass or more, based on the total amount of the composite active material, in that cycle characteristics of a lithium secondary battery using the obtained composite active material are more excellent. The upper limit is preferably 70% by mass or less, and more preferably 60% by mass or less.

Even when the content of the obtained battery active material in the composite active material is within the above range, the area ratio of the graphite exposed to the surface of the composite active material is within the above range.

Incidentally, in the case of using Si as the battery active material, when the content of Si in the composite active material is set to 30% by mass, the charge-discharge capacity derived from only Si is 1200 mAh/g or so.

The particle diameter of the composite active material (D50: 50% volume particle diameter) is not particularly limited, but is preferably 2 to 40 μm, more preferably 5 to 35 μm, and further preferably 5 to 30 μm, in that cycle characteristics of a lithium secondary battery using the obtained composite active material are more excellent.

Incidentally, the particle diameter (D90: 90% volume particle diameter) is not particularly limited, but is preferably 10 to 60 μm, and more preferably 20 to 45 μm, in that cycle characteristics of a lithium secondary battery using the obtained composite active material are more excellent.

Furthermore, the particle diameter (D10: 10% volume particle diameter) is not particularly limited, but is preferably 1 to 20 μm, and more preferably 2 to 10 μm, in that cycle characteristics of a lithium secondary battery using the obtained composite active material are more excellent.

D10, D50 and D90 respectively correspond to a particle diameter at the 10% cumulative, 50% cumulative and 90% cumulative from the fine particle side of the cumulative particle size distribution measured by a laser diffraction scattering method.

Incidentally, in the measurement, the composite active material is added to a liquid and vigorously mixed by using ultrasonic wave and the like, the prepared dispersion is introduced to an apparatus as a sample, and the measurement is performed. As the liquid, water or alcohol or a low-volatile organic solvent is preferably used in terms of operation. At this time, the obtained particle size distribution diagram preferably exhibits a normal distribution.

The bulk density of the composite active material is not particularly limited, but is preferably 0.5 g/cm$^3$ or more, and more preferably 0.7 g/cm$^3$, in order to increase the capacity per volume of the obtained composite active material. The upper limit is not particularly limited.

The method of measuring the bulk density is the same as the method of measuring the bulk density of the graphite described above, except using a 25 ml measuring cylinder.

The tap density of the composite active material is not particularly limited, but is preferably 0.8 g/cm$^3$ or more and more preferably 1.0 g/cm$^3$ or more, in order to increase the capacity per volume of the obtained composite active material. The upper limit is not particularly limited, and is preferably 1.6 g/cm$^3$ or less.

As the method of measuring the tap density, a sample is placed in a 25 ml measuring cylinder and is subjected to tapping, and the sample weight at the time that the capacity change is lost is divided by the sample volume.

The specific surface area (BET specific surface area) of the composite active material is not particularly limited, but is preferably 8 m$^2$/g or more and more preferably 5 m$^2$/g or more, in that cycle characteristics of a lithium secondary battery using the obtained composite active material are more excellent. The lower limit is not particularly limited, and is preferably 0.5 m$^2$/g or more.

As the method of measuring the specific surface area (BET specific surface area) of the composite active material, a sample is vacuum dried at 300° C. for 30 minutes, and then the specific surface area is measured according to the one-point method of nitrogen adsorption.

It is possible to coat the surface of the composite active material with carbon, as necessary. By carrying out the treatment, it is possible to adjust the surface area of the composite active material, to enhance the electrochemical stability.

The method of coating with carbon is not particularly limited, but examples include CVD method. More specifically, it is preferred to flow a gas such as toluene, to carry out a CVD treatment at 750 to 1100° C.

<Lithium Secondary Battery>

The composite active material described above is useful as an active material used for a battery material (electrode material) used in the lithium secondary battery.

The characteristics of the battery material using the composite active material include that the capacity close to the theoretical value of the battery material is obtained, the cycle characteristics are favorable, and the rate characteristics are excellent. The reasons for obtaining a capacity close to the theoretical value of the battery material include that the graphite having excellent conductivity can sufficiently exist around the refined battery active material. In addition, the reasons why cycle characteristics are good include that the battery active material is surrounded in close contact with a thin graphite layer and thus never lose a conductive path even if the battery active material is pulverized with cycles. Furthermore, the reasons why the rate characteristics are excellent include that, as a result of the battery active material being refined, the diffusion distance of Li ions is small. In particular, it is theoretically obvious that the smaller the particle diameter, the better the rate characteristics, and the excellent rate characteristics are first achieved by sufficiently securing a conductive path under an environment where it is securely retained in the thin graphite layer without falling the battery active material further refined with cycles.

The method for producing a negative electrode for a lithium secondary battery using a composite active material is not particularly limited, and a known method can be used.

For example, a composite active material and a binder can be mixed and formed into a paste using pressure molding or a solvent, and applied on a copper foil to obtain a negative electrode for a lithium secondary battery. More specifically, 92 g of a composite active material, 62 g of a 13% PVDF/NMP solution, 0.5 g of conductive carbon black, and 29 g of NMP are mixed, and good slurry can be obtained using a double arm mixer usually used.

Incidentally, as a current collector other than a copper foil, it is preferred to have a three-dimensional structure, in that the cycle of the battery is more excellent. Examples of the material of a current collector having a three-dimensional structure include carbon fibers, sponge-like carbon (sponge-like resin coated with carbon), metals, and the like.

The current collector having a three-dimensional structure (porous current collectors) includes plain weave wire mesh, expanded metal, lath net, metal foam, metal woven fabric, metal nonwoven fabric, carbon fiber woven fabric, and carbon fiber nonwoven fabric, as the porous body of the conductor of metal and carbon.

As the used binder, a known material can be used, for example, a fluorine resin such as polyvinylidene fluoride or polytetrafluoroethylene, SBR, polyethylene, polyvinyl alcohol, carboxymethyl cellulose, glue or the like is used.

In addition, examples of the solvent include water, isopropyl alcohol, N-methylpyrrolidone, dimethylformamide and the like.

At the time of forming a paste, as necessary, stirring and mixing may be carried out using a known stirrer, mixer, kneading machine, kneader or the like, as described above.

When preparing a coating slurry using a composite active material, it is preferred to add conductive carbon black, carbon nanotube or a mixture thereof as the conductive material. The shape of the composite active material obtained by the above step is often relatively granulated (particularly, generally spheroidized), and the contact between particles tends to be a point contact. To avoid this adverse effect, examples include a method of blending carbon black, carbon nanotube or a mixture thereof with the slurry. The carbon black, carbon nanotube or the mixture thereof can intensively agglomerate to a capillary portion formed by contact of the composite active material during drying of the slurry solvent, thus loss of contact (increased resistance) with cycles can be prevented.

The blending amount of the carbon black, carbon nanotube or the mixture thereof is not particularly limited, but is preferably 0.2 to 4 parts by mass and more preferably 0.5 to 2 parts by mass, based on 100 parts by mass of the composite active material. Examples of the carbon nanotube are single-walled carbon nanotubes and multi-walled carbon nanotubes.

(Positive Electrode)

As the positive electrode used in a lithium secondary battery having a negative electrode obtained by using the composite active material, a positive electrode using a known positive electrode material can be used.

The method for producing a positive electrode includes known methods, and includes a method of applying a positive electrode material and a positive electrode mixture including a bonding agent and a conductive agent to the surface of the current collector. The positive electrode material (positive electrode active material) includes metal oxides such as chromium oxide, titanium oxide, cobalt oxide and vanadium pentoxide, lithium metal oxides such as $LiCoO_2$, $LiNiO_2$, $LiNi_{1-y}Co_yO_2$, $LiNi_{1-x-y}Co_xAl_yO_2$, $LiMnO_2$, $LiMn_2O_4$ and $LiFeO_2$, chalcogen compounds of a transition metal such as titanium sulfide or molybdenum sulfide, conjugated polymer materials having conductivity such as polyacetylene, polyparaphenylene and polypyrrole, and the like.

(Electrolyte)

As an electrolyte used in a lithium secondary battery having a negative electrode obtained by using the composite active material, a known electrolyte can be used.

For example, as an electrolyte salt contained in the electrolyte, lithium salts such as $LiPF_6$, $LiBF_4$, $LiAsF_6$, $LiClO_4$, $LiB(C_6H_5)$, $LiCl$, $LiBr$, $LiCF_3SO_3$, $LiCH_3SO_3$, $LiN(CF_3SO_2)_2$, $LiC(CF_3SO_2)_3$, $LiN(CF_3CH_2OSO_2)_2$, $LiN(CF_3CF_3OSO_2)_2$, $LiN(HCF_2CF_2CH_2OSO_2)_2$, $LiN\{(CF_3)_2CHOSO_2\}_2$, $LiB\{(C_6H_3(CF_3)_2\}_4$, $LiN(SO_2CF_3)_2$, $LiC(SO_2CF_3)_3$, $LiAlCl_4$ or $LiSiF_6$ can be used. $LiPF_6$ and $LiBF_4$ are particularly preferable from the viewpoint of oxidation stability.

The electrolyte salt concentration in the electrolyte solution is preferably 0.1 to 5 mol/l, and more preferably 0.5 to 3 mol/l.

As the solvent used in the electrolyte, for example, a carbonate such as ethylene carbonate, propylene carbonate, dimethyl carbonate or diethyl carbonate, an ether such as 1,1- or 1,2-dimethoxyethane, 1,2-diethoxyethane, tetrahydrofuran, 2-methyltetrahydrofuran, γ-butyrolactone, 1,3-dioxofuran, 4-methyl-1,3-dioxolane, anisole or diethyl ether, a thioether such as sulfolane or methyl sulfolane, a nitrile such as acetonitrile, chloronitriles or propionitrile, an aprotic organic solvent such as trimethyl borate, tetramethyl silicate, nitromethane, dimethylformamide, N-methylpyrrolidone, ethyl acetate, trimethyl orthoformate, nitrobenzene, benzoyl chloride, benzoyl bromide, tetrahydrothiophene, dimethyl sulfoxide, 3-methyl-2-oxazoline, ethylene glycol or dimethyl sulfite can be used.

Incidentally, instead of the electrolyte, a polyelectrolyte such as a polymer solid electrolyte and a polymer gel electrolyte may be used. As the polymer compound constituting the matrix of the polymer solid electrolyte or polymer gel electrolyte, an ether polymer compound such as polyethylene oxide or a cross-linked product thereof, a methacrylate polymer compound such as poly methacrylate, an acrylate polymer compound such as polyacrylate, and a fluorine polymer compound such as polyvinylidene fluoride (PVDF) and a vinylidene fluoride-hexafluoropropylene copolymer are preferred. It can also be used as a mixture thereof. From the viewpoint of oxidation-reduction stability, a fluorine polymer compound such as PVDF or a vinylidene fluoride-hexafluoropropylene copolymer are particularly preferred.

(Separator)

As the separator used in the lithium secondary battery having a negative electrode obtained by using the composite active material, a known material can be used. For example, woven fabric, nonwoven fabric, synthetic resin microporous membrane and the like are exemplified. Synthetic resin microporous membrane is preferred, and among them, polyolefin microporous membrane is suitable from the viewpoint of membrane thickness, membrane strength, membrane resistance, and the like. Specifically, polyethylene and polypropylene microporous membranes, microporous membranes that combine these membranes, and the like are preferred.

A lithium secondary battery can have a form such as cylindrical, rectangular or button, according to a conventional method, by using the negative electrode, positive electrode, separator, electrolyte and other battery components described above (for example, current collector, gasket, sealing plate, case, and the like).

The lithium secondary battery of the present invention is used in various mobile electronic devices, and can be used particularly in laptop computers, laptop word processors, palmtop (pocket) personal computers, mobile phones, portable fax machines, portable printers, headphone stereos, video cameras, portable television, portable CD, portable MD, electric beard, electronic notebooks, transceivers, electric power tools, radios, tape recorders, digital cameras, portable copiers, portable game machines, and the like. In addition, further, the lithium secondary battery can be used as a secondary battery of electric vehicles, hybrid vehicles, vending machines, electric carts, storage systems for load leveling, condensers for home use, distributed power storage systems (built in stationary electric appliances), emergency power supply systems, and the like.

Incidentally, it is preferred that the lithium secondary battery using a negative electrode containing the composite active material of the present invention is used in a state that the battery active material capable of combining with lithium ions is charged 60% or more and the graphite is charged 50% or less, in a fully charged state. In particular, when silicon is used as the battery active material, the average charge-discharge potential of silicon is in the vicinity of 0.4 V with respect to a lithium reference electrode, and is nobler than that of graphite by 0.2 V or so. Therefore, when charging the lithium secondary battery using a negative electrode containing the composite active material, first, the silicon is charged, then the charging of the graphite begins. In the graphite negative electrode of a lithium secondary battery, LiC6 is generated by charging, but this material is a material chemically and thermally unstable. In the above embodiment, even immediately after charging, exposure of LiC6 to the surface of the composite active material is small since the charging amount of the graphite covering most of the surface is small. Therefore, it is possible to suppress heat generation by immediately reacting with the electrolyte even if SEI film is decomposed.

In addition, in the lithium secondary battery using a negative electrode including the composite active material of the present invention, it is preferred to be used in a range where the potential of the negative electrode is not less than 0.4 V with respect to a lithium reference electrode. When used in this range, exposure of LiC6 to the surface of the composite active material is small for the same reason as described above, and therefore, it is possible to suppress heat generation by immediately reacting with the electrolyte even if SEI film is decomposed.

EXAMPLES

Hereinafter, the present invention will be described in more detail by examples, but the present invention is not limited thereto.

Example 1

(Preparation of Expanded Graphite)

Flake natural graphite having an average particle diameter of 1 mm was immersed in a mixed acid of 9 parts by weight of sulfuric acid and 1 part by weight of nitric acid at room temperature for 1 hour, thereafter the mixed acid was removed with No. 3 glass filter to obtain an acid treated graphite. Furthermore, the acid treated graphite was washed with water and then dried. When 5 g of the dried acid treated graphite was stirred in 100 g of distilled water, and the pH was measured after 1 hour, pH was 6.7. The dried acid treated graphite was put into a vertical electric furnace under a nitrogen atmosphere set at 850° C., to obtain an expanded graphite. The bulk density of the acid treated graphite was 0.78 g/cm³. The specific surface area of the expanded graphite was 42 m²/g, the bulk specific gravity was 0.023 g/cm², and the average thickness of the layer of the laminated graphene sheets was 21 nm.

(Mixing Step)

Metal Si having an average particle diameter of 0.23 μm (15 parts by mass) was put into 3000 parts by mass of ethanol in a beaker, and the mixture was stirred for 2 minutes.

The expanded graphite (35 parts by mass) was added to the ethanol in which metal Si was dispersed, to prepare a homogeneous mixed slurry containing the expanded graphite and metal Si fine powder. Using an evaporator, the ethanol was recovered from this slurry, to obtain a powder mixture.

(Spheroidization Step)

The powder mixture obtained above was granulated and molded into spherical shape using a pin mill (manufactured by Julius Fritsche GmbH) (rotor diameter: 10 cm, rotational speed: 8000 rpm, processing time: 2 minutes), to obtain a generally spherical composite active material for lithium secondary batteries including 70% by mass of graphite and 30% by mass of metal Si.

The physical properties thereof are as follows. Bulk density: 0.65 g/cm³, tap density: 1.15 g/cm², D90 particle size distribution: 45 μm, D50: 28 μm, D10: 6.7 μm, XRD: refer to FIG. 1A, specific surface area: 10.7 m²/g, shape: refer to SEM in FIG. 2, average aspect ratio: 1.45.

As shown in FIG. 1A, a diffraction pattern of the graphite and crystalline Si is observed in the XRD of the composite active material obtained above. Therefore, it is clear that the metal Si does not change to SiC or the like and is dispersed and exists in the graphite layer.

Figure 1B:
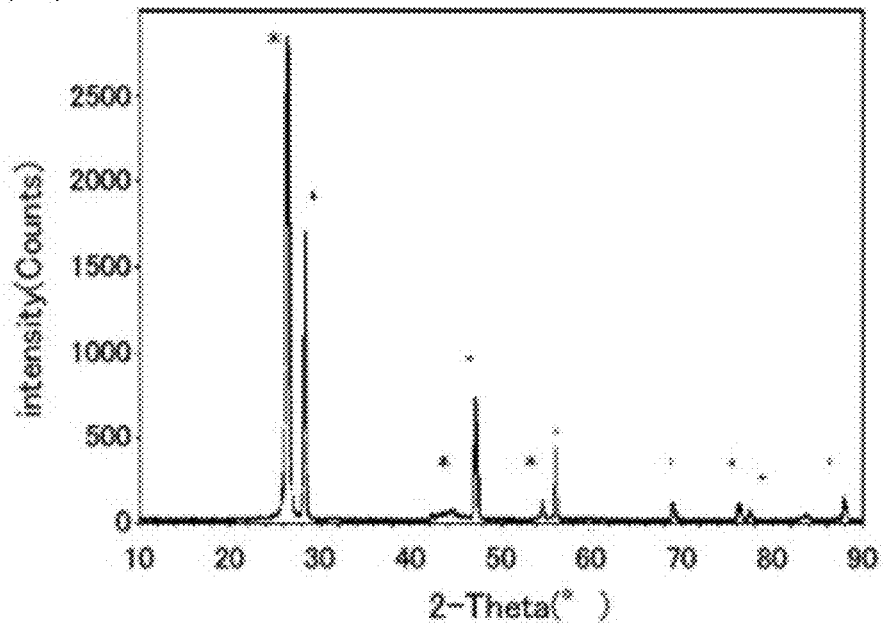
FIG. 1(B) is an XRD diffraction pattern (*: peaks derived from expanded graphite, +: peaks derived from Si) of the mixture of an expanded graphite and a standard silicon sample.

In addition, the diffraction pattern of a mixed material of expanded graphite before complexation with Si and a standard silicon material is shown in FIG. 1B. Comparing FIG. 1A with FIG. 1B, no change is observed in the diffraction pattern of the expanded graphite after complexation. In view of the above, it can be seen that, metal Si fine particles are not intercalated into the interlayer of the graphite, and the metal Si fine particles are in a state in which the metal Si fine particles are contained by folded graphite.

Figure 2A:
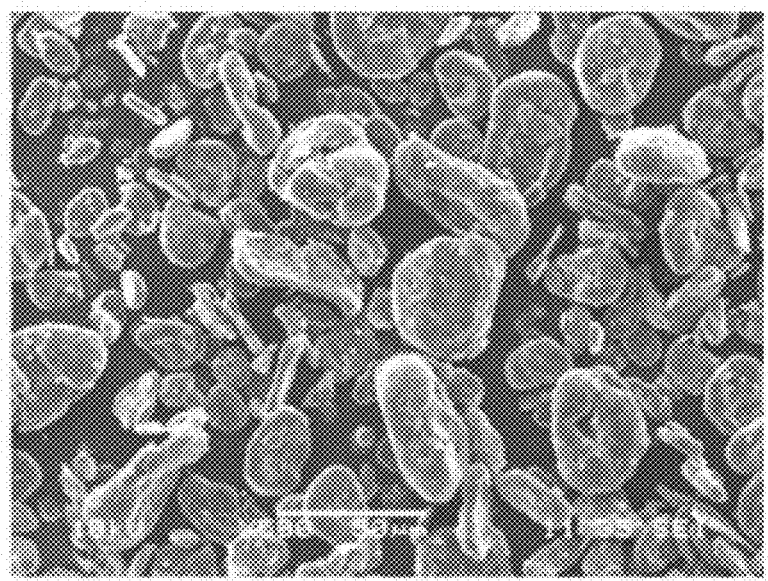
FIG. 2 is a secondary electron image (accelerating voltage of 10 kV) by SEM (scanning electron microscope) of a composite active material for lithium secondary batteries prepared in Example 1, (A) magnification: 500 times, (B) magnification: 2,000 times.
Figure 2B:
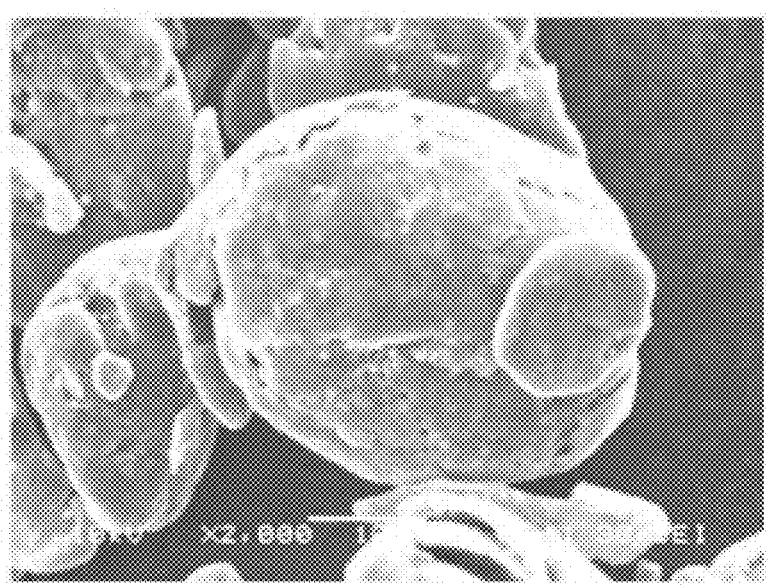

FIG. 2 is a diagram in which a secondary electron image of the composite active material of Example 1 is observed using SEM (scanning electron microscope) at a low accelerating voltage of 10 kV or less. As can be seen from the drawing, it is possible to clearly observe Si metal particles of the battery active material by transmitting the graphite surface.

In view of the above, in the composite active material, it is possible to directly observe that it is a structure in which the battery active material sandwiched with a thin graphite layer. Also, it can be confirmed at the same time that there is very little battery active material exposed to the surface, and the graphite edge surface is not present on the surface of the composite.

More specifically, the area ratio of the graphite that was exposed to the surface of the composite active material for lithium secondary batteries observed by SEM observation was 98%, and the area ratio of the exposed Si metal was 2%.

Figure 12:
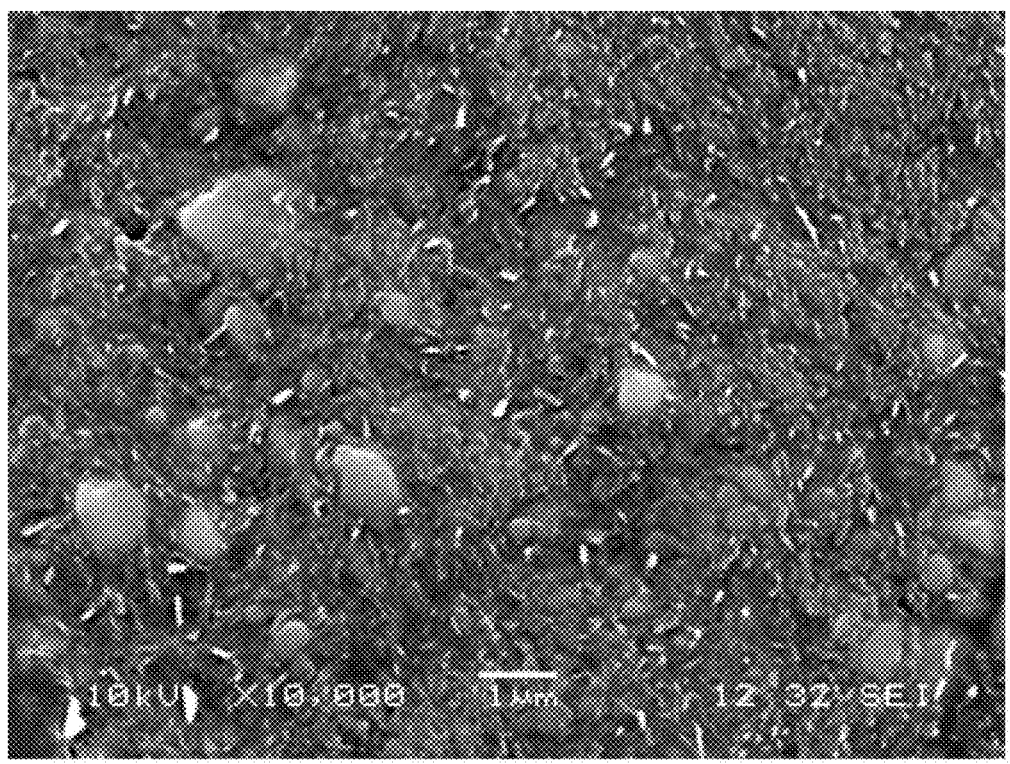
FIG. 12 is a secondary electron image (accelerating voltage of 10 kV, magnification: 10,000 times) by SEM (scanning electron microscope) of a cross section of a composite active material for lithium secondary batteries prepared in Example 1.

FIG. 12 is a diagram in which a secondary electron image of the cross section of the composite active material in Example 1 using SEM. In order to observe the cross section of the composite active material, the following procedures were performed. First, the composite active material was cured with a resin for fixing a microscope sample, and then subjected to polishing with No. 400 sandpaper and then subjected to polishing with No. 1500 sandpaper, and then subjected to polishing with No. 2000 sandpaper. Thereafter, the composite active material was polished with 0.5 μm alumina polishing agent, and finally polished with 0.02 μm diamond paste, thereby exposing the cross section of the composite active material, then the cross section of the composite active material was made conductive by sputtering method, and SEM observation was performed.

A plurality of secondary electron images of the cross section of the composite active material represented by FIG. 12 was shot, and 120 secondary particles of metal Si fine particles observed in the images were observed. When calculating the average diameter of the secondary particles by image analysis, its value was 2 μm or less, and no formation of large secondary particles was seen.

(Negative Electrode Production)

92 parts by mass of the composite active material, 62 parts by mass of a PVDF containing NMP solution (PVDF (polyvinylidene fluoride) (content: 13%), 0.5 part by mass of conductive carbon black, and 29 parts by mass of NMP were weighed, and mixed for 3 minutes using a double arm mixer to prepare a coating slurry.

This slurry was coated on a copper foil and dried to produce a negative electrode. Thereafter, a half cell was prepared with Li metal as a counter electrode, using a $LiPF_6$ electrolyte with ethylene carbonate:diethyl carbonate=1:3, 1.2 mol/liter, and the following battery evaluation was performed.

(Battery Evaluation: Charge-Discharge Capacity and Cycle Characteristics)

The charge-discharge capacity and cycle characteristics of the obtained composite active material were evaluated using the half cell.

A cycle experiment was performed using both charging and discharging rate of C/20, a cut-off voltage at the charging side of 0.01 V, and a cut-off voltage at the discharging side of 1.5 V. In this half cell, when the theoretical capacity of Si is set to 4200 mAh/g, the calculated theoretical capacity is 1220 mAh/g, but because the initial irreversible capacity is 220 mAh/g, the calculated reversible capacity is 1000 mAh/g.

Figure 3:
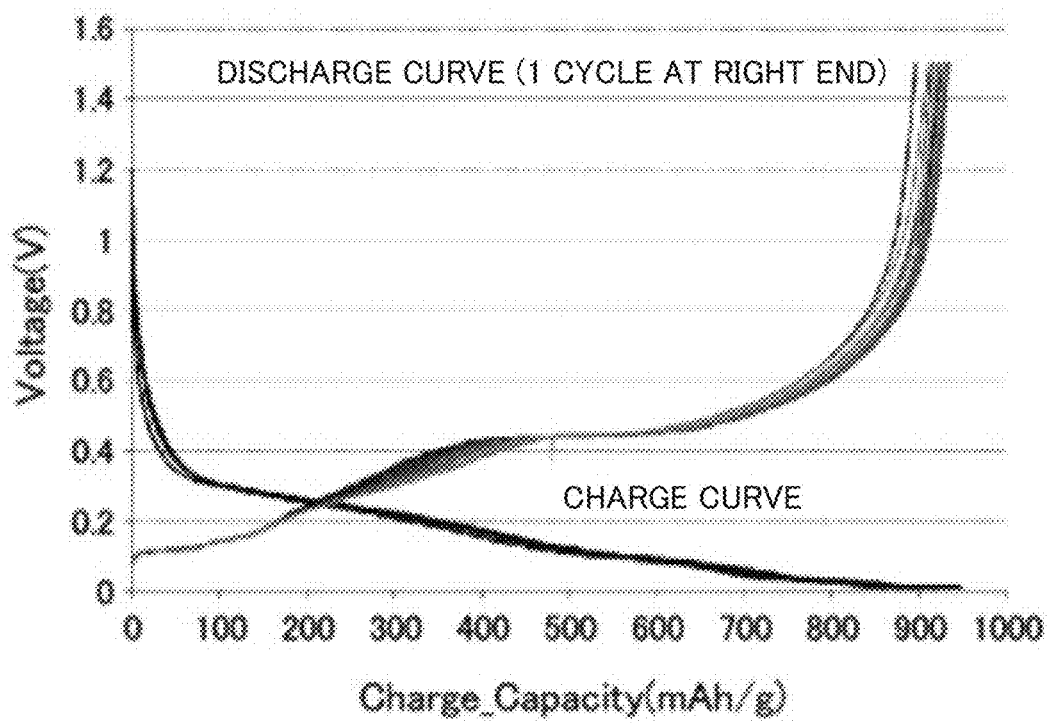
FIG. 3 is a diagram showing the charge-discharge capacity of a half cell using a composite active material for lithium secondary batteries prepared in Example 1 and changes in the charge-discharge capacity with the cycles.

As shown in FIG. 3, as the values obtained from the experiment, both charge capacity and discharge capacity, 950 mAh/g that was close to the calculated values were obtained. Incidentally, the reason why the actual discharge capacity was smaller than the calculated value was considered that a part of the Si active material fell off when producing the composite active material.

Figure 4:
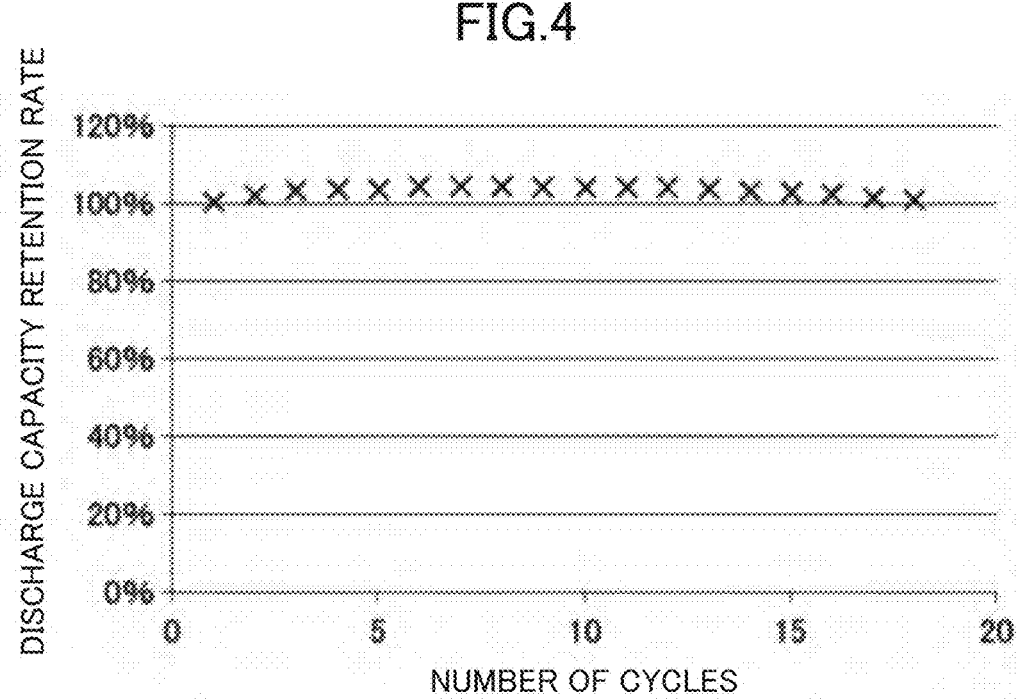
FIG. 4 is a diagram showing changes in charge capacity due to the cycles of a half cell using a composite active material for lithium secondary batteries prepared in Example 1.

The result of the evaluation of cycle characteristics at C/20 up to 18 cycles is shown in FIG. 4.

Figure 5:
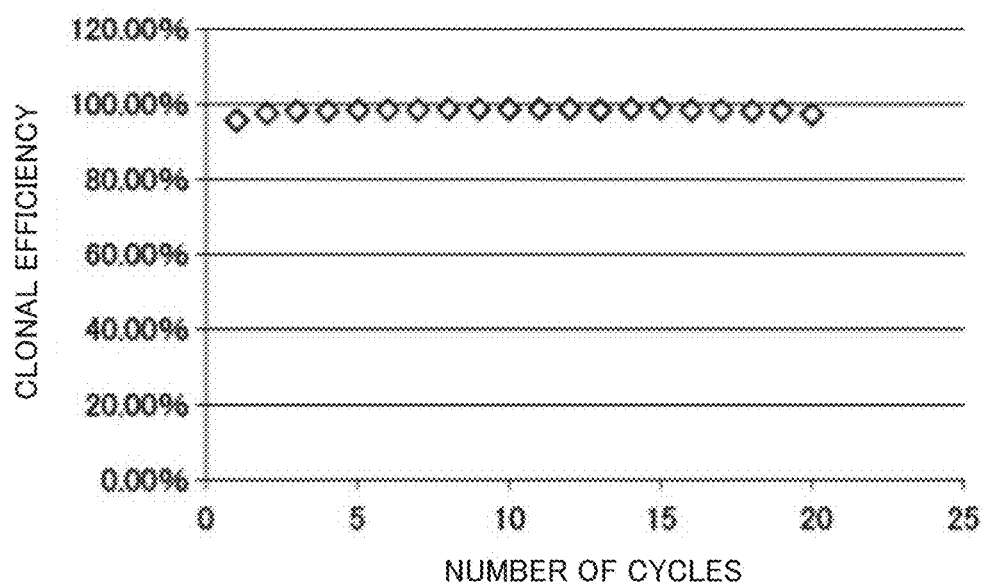
FIG. 5 is a diagram showing changes in coulomb efficiency due to the cycles of a half cell using a composite active material for lithium secondary batteries prepared in Example 1.

As shown in FIG. 4, no deterioration was observed at all in the discharge capacity. Also, it was confirmed that this half cell had very high coulombic efficiency (which maintained 100% after a few cycles) (refer to FIG. 5).

(Evaluation: Rate Characteristics)

Rate characteristics of the composite active material were evaluated, using the previously prepared half cell.

Figure 6:
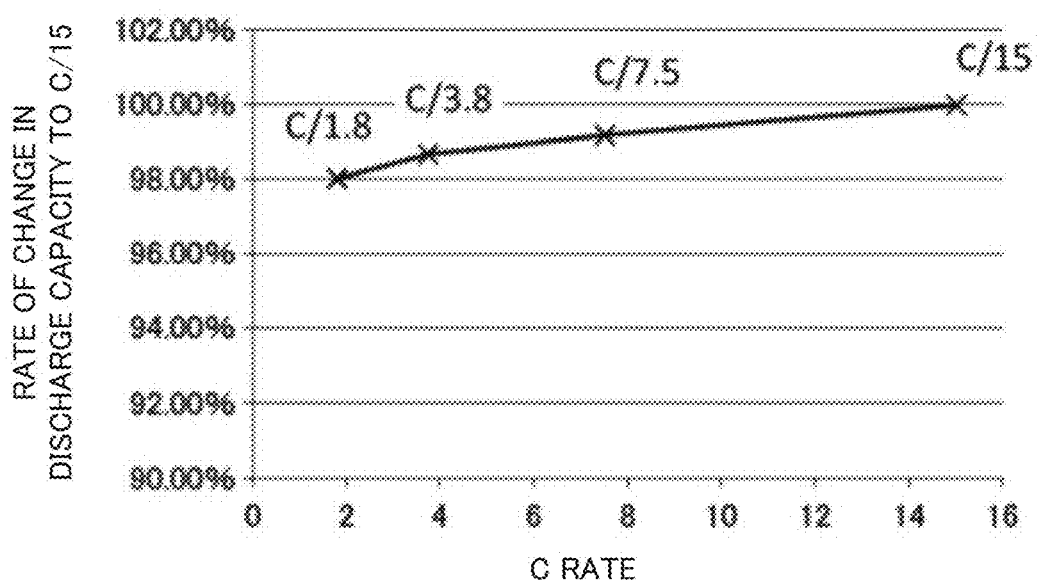
FIG. 6 is a diagram showing rate characteristics of a half cell using a composite active material for lithium secondary batteries prepared in Example 1.

Charging was performed at C/15, and discharging was performed at C/15, C/7.5, C/3.8, and C/1.8. The cut-off voltage at the charging side was set to 0.01 V, and the cut-off voltage at the discharging side was set to 1.5 V. The very high discharge capacity as 98% of the discharge capacity obtained at C/15 was obtained even at C/1.8 as shown in FIG. 6, thus it was confirmed that this material had very good rate characteristics.

Example 2

(Preparation of Expanded Graphite)

An expanded graphite was obtained in the same manner as in Example 1. 1 part by mass of the expanded graphite was mixed with 80 parts by mass of ethanol, and treatment in an ultrasonic bath for 10 minutes encourages dissociation of the graphene sheets stacked inside the expanded graphite, and the specific surface area was increased. The specific surface area of the resulting expanded graphite was 98 m$^2$/g, and the bulk specific gravity was 0.006 g/cm$^3$.

(Mixing Step, Spheroidization Step)

In the same manner as in Example 1, mixing step and spheroidization step were carried out to obtain a generally spherical composite active material for lithium secondary batteries including 70% by mass of graphite and 30% by mass of metal Si.

The physical properties thereof are as follows. Bulk density: 0.66 g/cm$^3$, tap density: 1.17 g/cm$^3$, particle size distribution D90: 24 μm, D50: 11 μm, D10: 6.5 μm, specific surface area: 11.2 m$^2$/g, shape: refer to SEM in FIG. 13, average aspect ratio: 1.56.

Figure 13A:
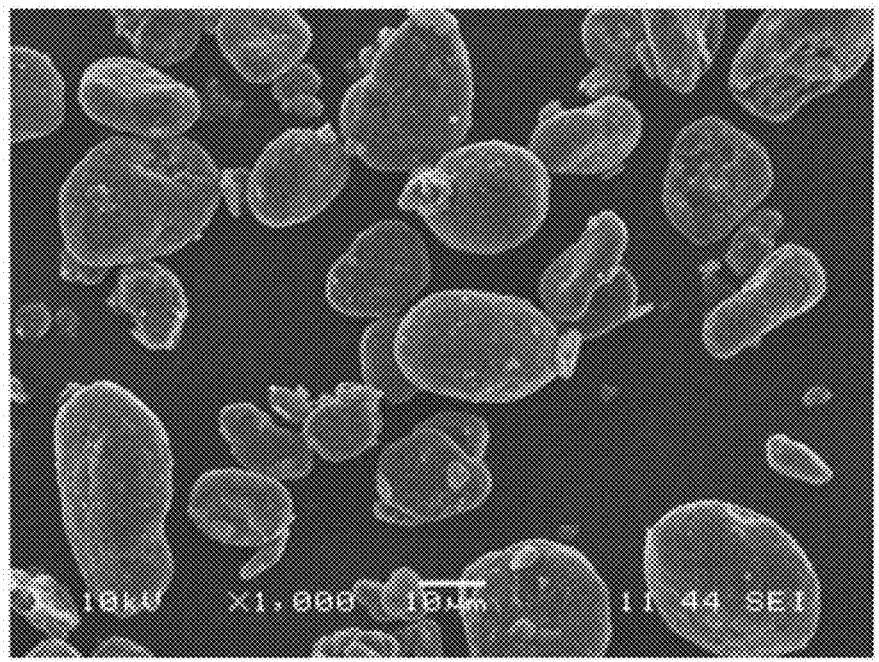
FIG. 13 is a secondary electron image (accelerating voltage of 10 kV) by SEM (scanning electron microscope) of a composite active material for lithium secondary batteries prepared in Example 2, (A) magnification: 1,000 times, (B) magnification: 4,000 times.
Figure 13B:
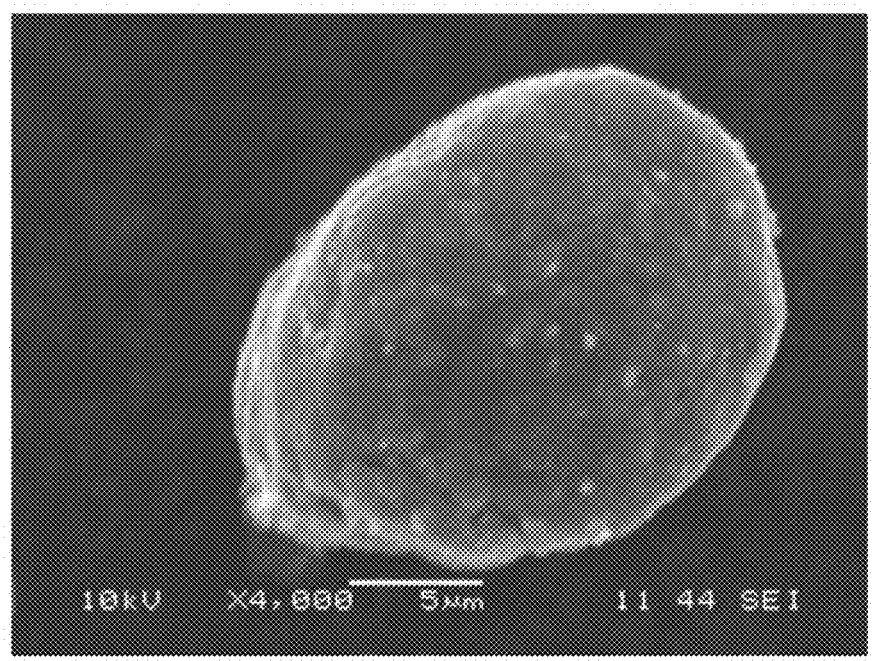

FIG. 13 is a diagram in which a secondary electron image of the composite active material of Example 2 is observed using SEM (scanning electron microscope) at a low accelerating voltage of 10 kV or less. As can be seen from the drawing, it is possible to clearly observe Si metal particles of the battery active material by transmitting the graphite surface.

In view of the above, in the composite active material, it is possible to directly observe that it is a structure in which the battery active material sandwiched with a thin graphite layer. Also, it can be confirmed at the same time that there is very little battery active material exposed to the surface, and the graphite edge surface is not present on the surface of the composite.

More specifically, the area ratio of the graphite that was exposed to the surface of the composite active material for lithium secondary batteries observed by SEM observation was 98%, and the area ratio of the exposed Si metal was 2%.

Figure 14:
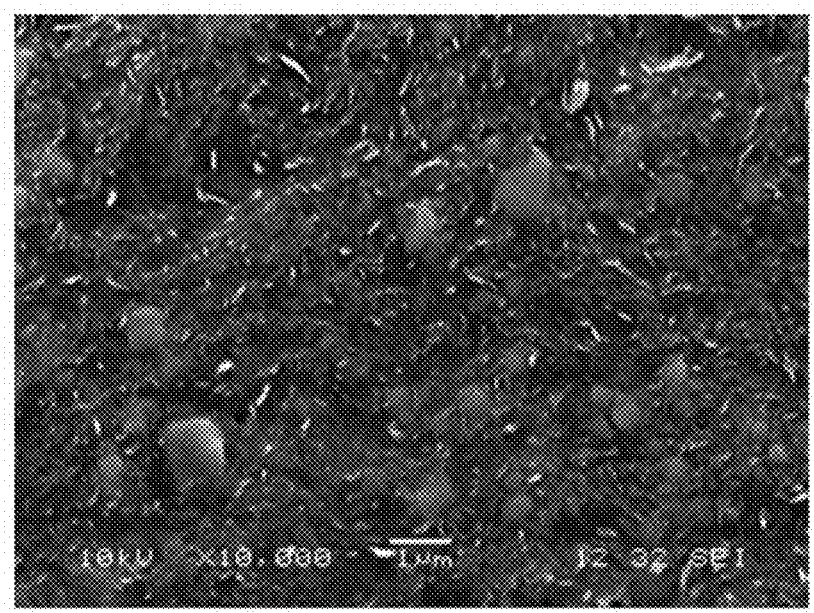
FIG. 14 is a secondary electron image (accelerating voltage of 10 kV, magnification: 10,000 times) by SEM (scanning electron microscope) of a cross section of a composite active material for lithium secondary batteries prepared in Example 2.

FIG. 14 is a diagram in which a secondary electron image of the composite active material of Example 2 is observed using SEM in the same manner as in Example 1. A plurality of secondary electron images of the cross section of the composite active material represented by FIG. 14 was shot, and 120 secondary particles of metal Si fine particles observed in the images were observed. When calculating the average diameter of the secondary particles by image analysis, its value was 2 μm or less, and no formation of large secondary particles was seen.

Here, the procedures for observing the cross section of the composite active material were the same as in Example 1.

(Negative Electrode Production)

92 parts by mass of the composite active material described above, 62 parts by mass of a PVDF containing NMP solution (PVDF (polyvinylidene fluoride) content: 13%), 0.5 part by mass of conductive carbon black, and 29 parts by mass of NMP were weighed, and mixed for 3 minutes using a double arm mixer to prepare a coating slurry. This slurry was coated on a carbon cloth (Toray Industries, Inc. TCC-4310) and dried to produce a negative electrode.

(Positive Electrode Production)

84 parts by mass of LiNi$_{1-x-y}$Co$_x$Al$_y$O$_2$, 66 parts by mass of a PVDF containing NMP solution (PVDF (polyvinylidene fluoride) (content: 12%), 8 parts by mass of conductive carbon black, and 29 parts by mass of NMP were weighed, and mixed for 3 minutes using a double arm mixer to prepare a coating slurry. This slurry was coated on an aluminum foil and dried to produce a positive electrode.

(Full Cell Production)

Using the negative electrode and the positive electrode described above as electrodes, a full cell was prepared using a LiPF$_6$ electrolyte with ethylene carbonate:diethyl carbonate=1:3, 1.2 mol/liter, and the following battery evaluation was performed.

(Battery Evaluation: Charge-Discharge Capacity and Cycle Characteristics)

The charge-discharge capacity and cycle characteristics of the obtained composite active material were evaluated using the full cell.

Figure 15:
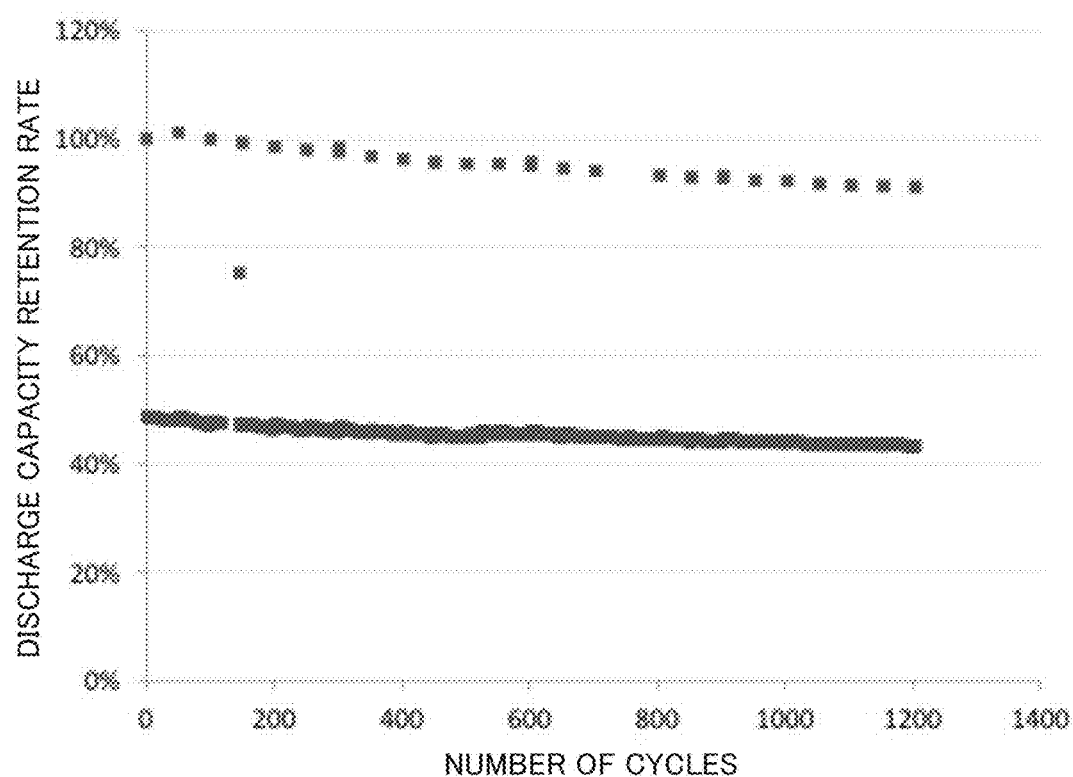
FIG. 15 is a diagram showing changes in discharge capacity due to the charge-discharge cycles of a full cell using a composite active material for lithium secondary batteries prepared in Example 2.

A cycle experiment was performed at a depth of discharge of 40% using a charging and discharging rate of C/5 for both charging and discharging, a cut-off voltage at the charging side of 3.9 V, and a cut-off voltage at the discharging side of 3.3 V. In this test, the discharge capacity retention rate based on the discharge capacity (initial capacity) before start of the cycle test was evaluated at C/10 for every 50 cycles, a cut-off voltage at the charging side of 4.1 V, and a cut-off voltage at the discharging side of 2.7 V. In FIG. 15, the result of the evaluation of cycle characteristics up to 1200 cycles is shown. The discharge capacity at a depth of discharge of 40% after 1200 cycles maintained a capacity of the discharge capacity of 89% immediately after the start of the cycle test. Also, the discharge capacity retention rate for every 50 cycles after 1200 cycles maintained an initial capacity of 91%, thus very good cycle characteristics were observed. In Example 2, an expanded graphite was mixed with ethanol, then treatment was carried out in an ultrasonic bath for 10 minutes, and the specific surface area of the expanded graphite was increased, and it is considered that the dispersion of the Si particles to the inside of the expanded graphite is promoted by this, and the less formation of secondary particles has contributed to good cycle characteristics.

(Evaluation: Rate Characteristics)

Rate characteristics of the composite active material were evaluated, using the previously prepared full cell.

Figure 16:
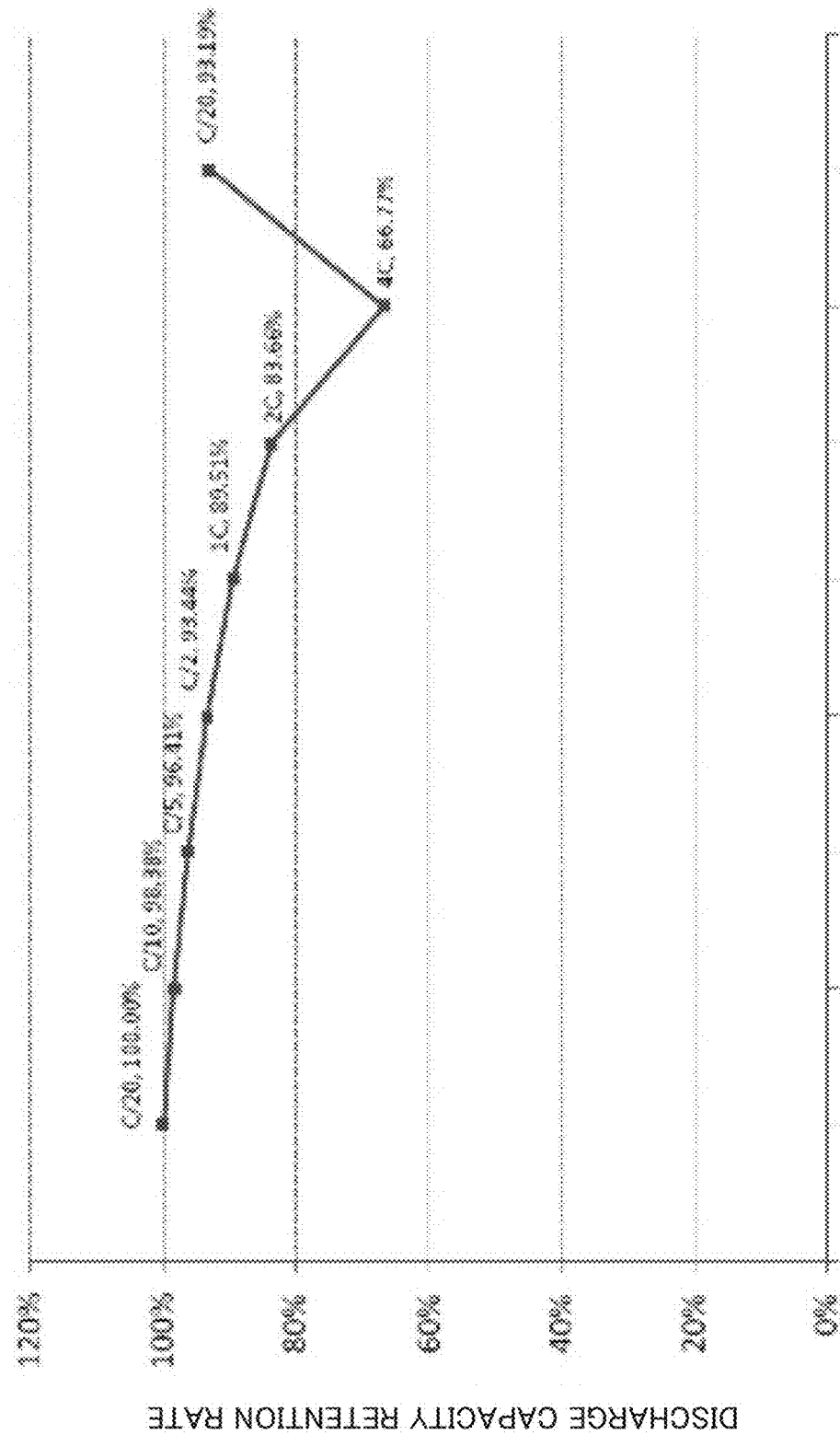
FIG. 16 is a diagram showing a relationship between the charge-discharge rate and the discharge capacity retention rate of the full cell using a composite active material for lithium secondary batteries prepared in Example 2.

Charging was performed at C/10, and discharging was performed at C/20, C/10, C/5, C/2, 1 C, 2 C, and 4 C. The cut-off voltage at the charging side was set to 4.1 V, and the cut-off voltage at the discharging side was set to 2.7 V. The discharge capacity as high as 67% of the discharge capacity obtained at C/20 was obtained even at 4 C as shown in FIG. 16, thus it was confirmed that this material had very good rate characteristics.

Comparative Example 1

Hereinbelow, an embodiment of Comparative Example 1 will be described in detail. Here, Comparative Example 1 corresponds to the embodiment as described in Patent Literature 1. In the embodiment, the predetermined graphite is not used.

(Mixing Step)

Metal Si having an average particle diameter of 0.23 μm (15 parts by mass) was put into 3000 parts by mass of ethanol in a beaker, and the mixture was stirred for 2 minutes.

Commercially available flake graphite (specific surface area of 2 m$^2$/g or less) (35 parts by mass) was added to ethanol in which metal Si was dispersed, to prepare a homogeneous mixed slurry containing flake graphite and metal Si fine powder. The ethanol was recovered from this slurry using an evaporator to obtain a powder mixture.
(Spheroidization Step)

The powder mixture obtained above was granulated and molded into spherical shape using a pin mill (manufactured by Julius Fritsche GmbH) (rotor diameter: 10 cm, rotational speed: 18000 rpm, processing time: 2 minutes), to obtain a generally spherical composite active material for lithium secondary batteries.

The physical properties thereof are as follows. Tap density: 0.9 g/cm$^2$, D50 particle size distribution: 18 μm. The mass ratio of the metal Si to the total amount of the composite active material was estimated as 36% by mass from TGA measurement.

Figure 7A:
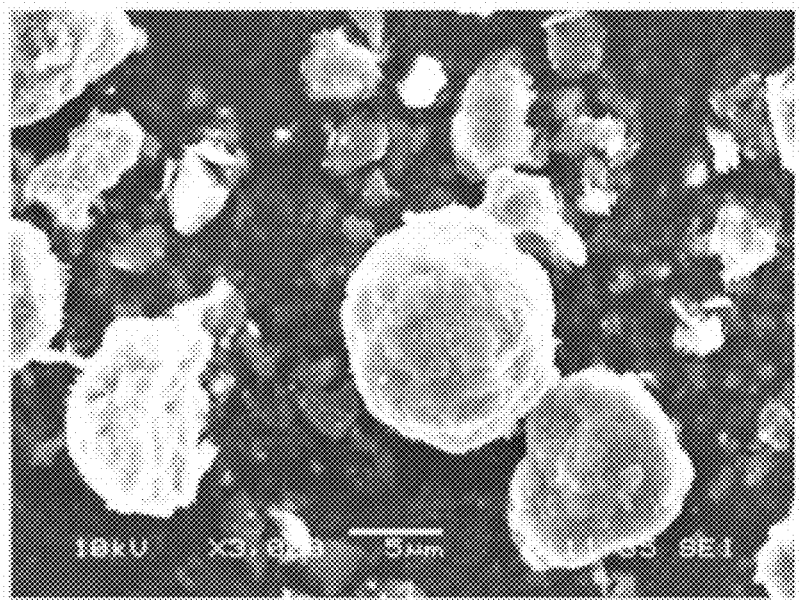
FIG. 7 is a secondary electron image (accelerating voltage of 10 kV) by SEM (scanning electron microscope) of a composite active material for lithium secondary batteries prepared in Comparative Example 1, (A) magnification: 3,000 times, (B) magnification: 10,000 times.
Figure 7B:
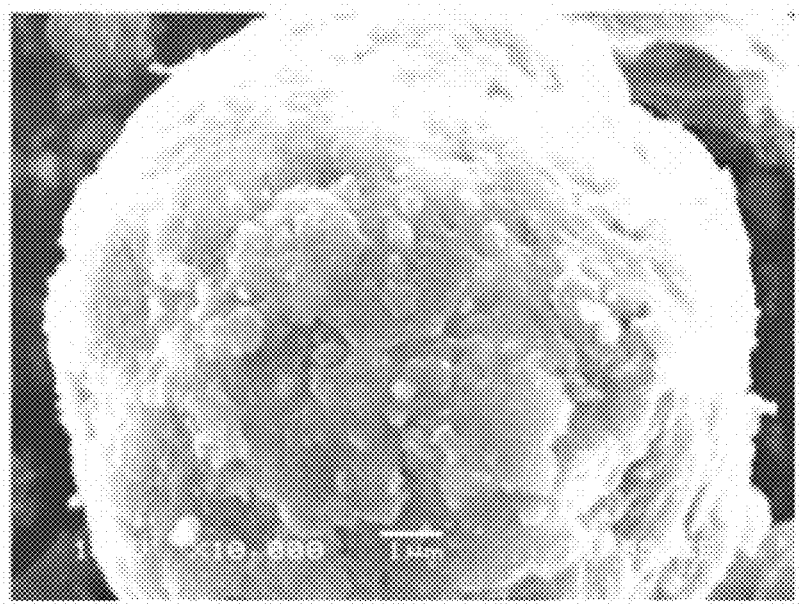

FIG. 7 is a diagram in which a secondary electron image of the composite active material is observed using SEM (scanning electron microscope) at a low accelerating voltage of 10 kV or less. As is shown in the drawing, in this composite active material, how the edge portion of the graphite was folded was not confirmed, and the structure in which graphite pieces were overlapped was confirmed.

In addition, it was not possible to clearly observe Si metal particles of the battery active material by transmitting the graphite surface by SEM (scanning electron microscope) observation at a low accelerating voltage of 10 kV or less. Also, the presence of many Si particles was confirmed on the surface.

More specifically, the area ratio of the graphite exposed to the surface of the composite active material for lithium secondary batteries observed by SEM observation was 55%, and the area ratio of the exposed Si metal was 45%.

Figure 17:
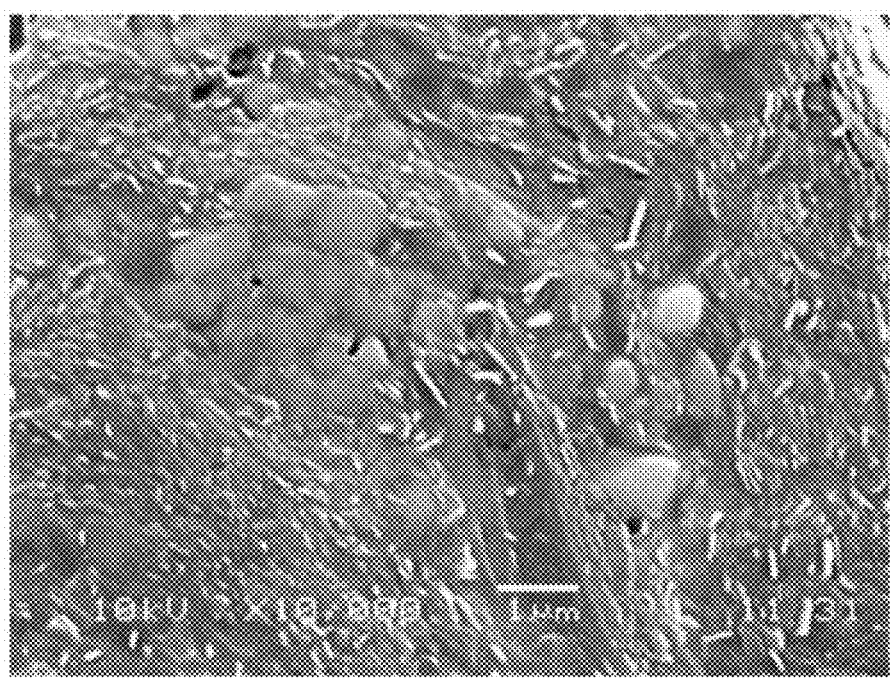
FIG. 17 is a secondary electron image (accelerating voltage of 10 kV, magnification: 10,000 times) by SEM (scanning electron microscope) of a cross section of a composite active material for lithium secondary batteries prepared in Comparative Example 1.

FIG. 17 is a diagram in which a secondary electron image of the cross section of the composite active material of Example 2 is observed using SEM in the same manner as in Example 1. As can be seen in the drawing, many secondary particles of Si particles were confirmed. A plurality of secondary electron images of the cross section of the composite active material represented by FIG. 17 was shot, and 120 secondary particles of metal Si fine particles observed in the images were observed. When calculating the average diameter of the secondary particles by image analysis, its value exceeded 5 μm, and formation of large secondary particles was markedly seen.
(Battery Evaluation: Charge-Discharge Capacity and Cycle Characteristics)

Next, a half cell was prepared using the obtained composite active material according to the same procedures as (Negative Electrode Production) in Example 1 described above, and battery evaluation was performed according to the same battery evaluation (charge-discharge capacity and cycle characteristics) as in Example 1.

In this half cell, when the theoretical capacity of Si is set to 4200 mAh/g, the calculated theoretical capacity is 1520 mAh/g, but because the initial irreversible capacity is 274 mAh/g, the calculated reversible capacity is 1246 mAh/g.

Figure 8:
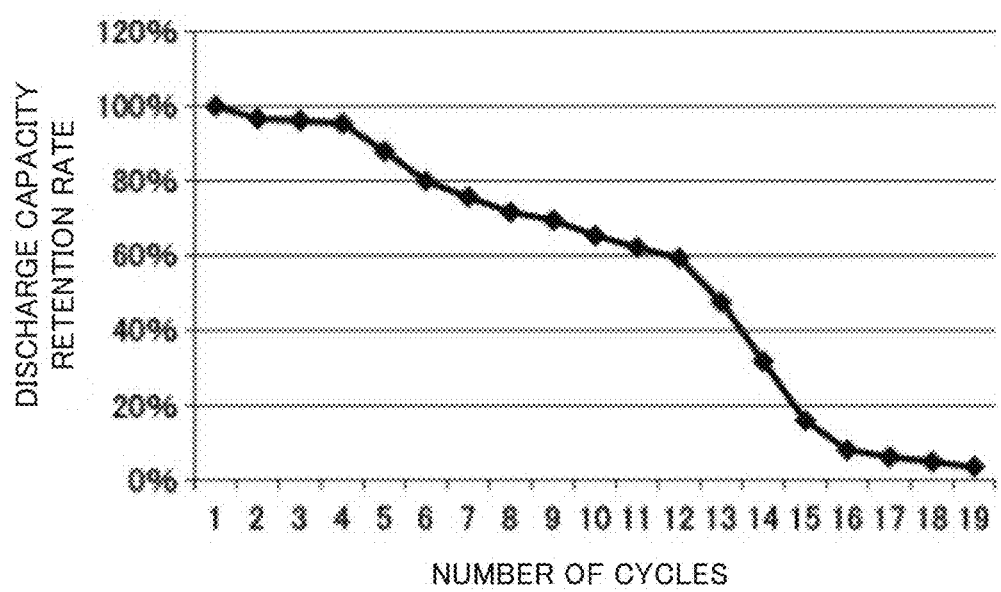
FIG. 8 is a diagram showing changes in charge capacity due to the cycles of a half cell using a composite active material for lithium secondary batteries prepared in Comparative Example 1.

As the initial discharge capacity, a value close to the calculated value as 1250 mAh/g was obtained. However, as shown in FIG. 8, the capacity of this half cell rapidly deteriorated and greatly declined to 66% of the initial capacity after 10 cycles, and 4% after 19 cycles.

As can be seen from the results, in the embodiment using the composite active material described in Patent Literature 1, the desired effect cannot be obtained.

Comparative Example 2

Hereinbelow, an embodiment of Comparative Example 2 will be described in detail. Incidentally, Comparative Example 2 corresponds to the embodiment disclosed in Patent Literature 2. In this embodiment, the spheroidization step is not performed.
(Mixing Step)

Metal Si (15 parts by mass) having an average particle diameter of 0.23 μm was put into 3000 parts by mass of ethanol in a beaker, and the mixture was stirred for 2 minutes.

The expanded graphite (35 parts by mass) used in Example 1 was added to the ethanol in which metal Si was dispersed, to prepare a homogeneous mixed slurry containing the expanded graphite and metal Si fine powder. Using an evaporator, the ethanol was recovered from this slurry, to obtain a powder mixture. In the mixture, the content of the graphite was 70% by mass, and the content of the metal Si was 30% by mass.
(Electrode Preparation)

The powder mixture obtained above (250 mg) was evenly spread over the stainless steel mesh (5 cm×5 cm), then compressed by applying a force of 100 kg weight per 1 cm$^2$ for 2 minutes, to prepare an electrode. The thickness of the obtained electrode was 0.2 μm.

Figure 9A:
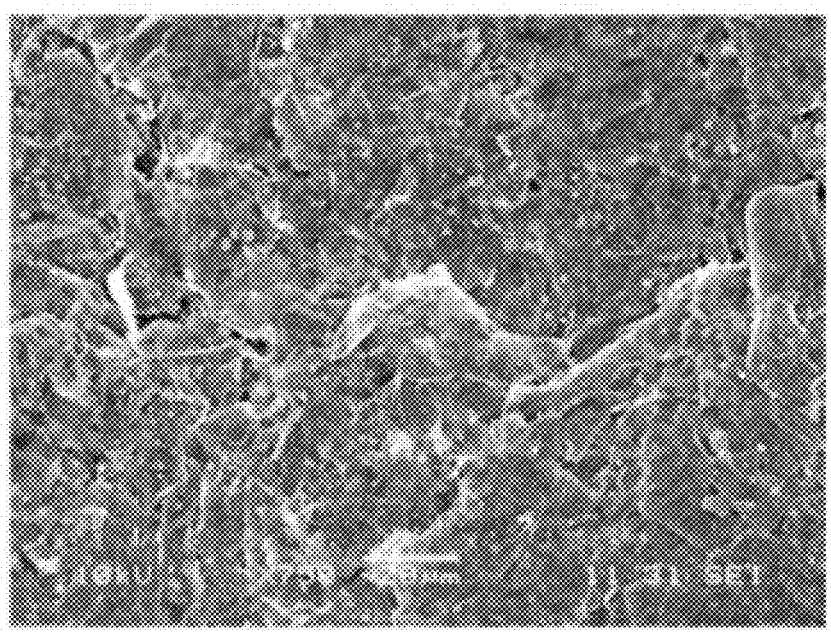
FIG. 9 is a secondary electron image (accelerating voltage of 10 kV) by SEM (scanning electron microscope) of a composite active material for lithium secondary batteries prepared in Comparative Example 2, (A) magnification: 750 times, (B) magnification: 5,000 times.
Figure 9B:
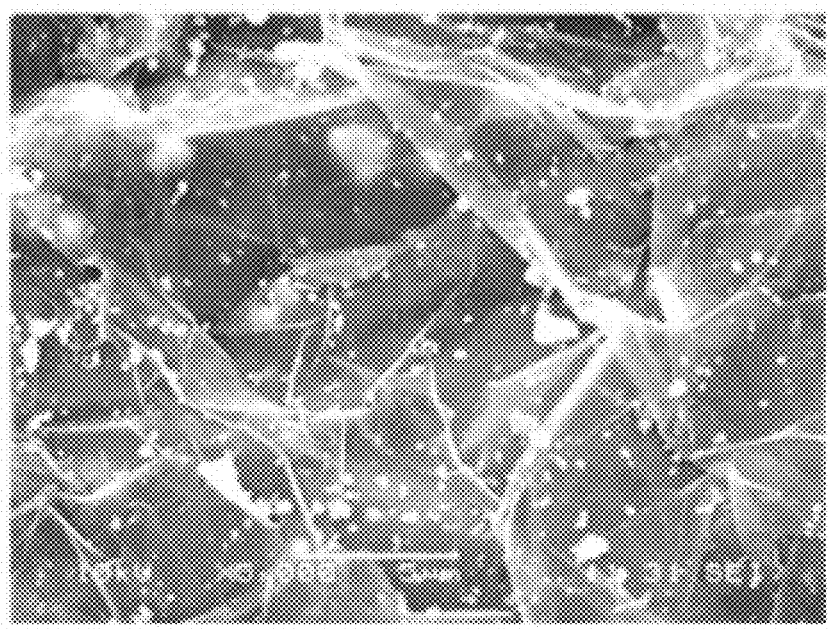

FIG. 9 is a diagram in which a secondary electron image of the above-described electrode is observed using SEM (scanning electron microscope) at a low accelerating voltage of 10 kV or less. As is shown in the drawing, it was possible to observe Si metal particles of the battery active material by transmitting the graphite surface by SEM (scanning electron microscope) observation at a low accelerating voltage of 10 kV or less.

More specifically, the area ratio of the graphite that was exposed to the surface of the composite active material for lithium secondary batteries observed by SEM observation was 98%, and the area ratio of the exposed Si metal was 2%.

However, as shown in FIG. 9, graphite containing metal Si only overlaps in the compression direction in the composite active material in the electrode is not spheroidized. Further, it is not confirmed that the edge portion of the graphite was folded, and the structure in which graphite pieces were overlapped was confirmed.
(Battery Evaluation: Charge-Discharge Capacity and Cycle Characteristics)

Next, using the electrode obtained by compression, a half cell was prepared with Li metal as a counter electrode, using a LiPF$_6$ electrolyte with ethylene carbonate:diethyl carbonate=1:3, 1.2 mol/liter, and battery evaluation was performed according to the same battery evaluation (charge-discharge capacity and cycle characteristics) as in Example 1.

In this half cell, when the theoretical capacity of Si is set to 4200 mAh/g, the calculated theoretical capacity is 1220 mAh/g, but because the initial irreversible capacity is 220 mAh/g, the calculated reversible capacity is 1000 mAh/g.

The values obtained from the experiment, both charge capacity and discharge capacity, were 890 mAh/g that was the value lower than the calculated values or the values obtained in Example 1. Incidentally, the reason why the discharge capacity is small is considered that contact of the metal Si with the graphite is insufficient in this electrode, as compared to the case being spheroidized.

Figure 10:
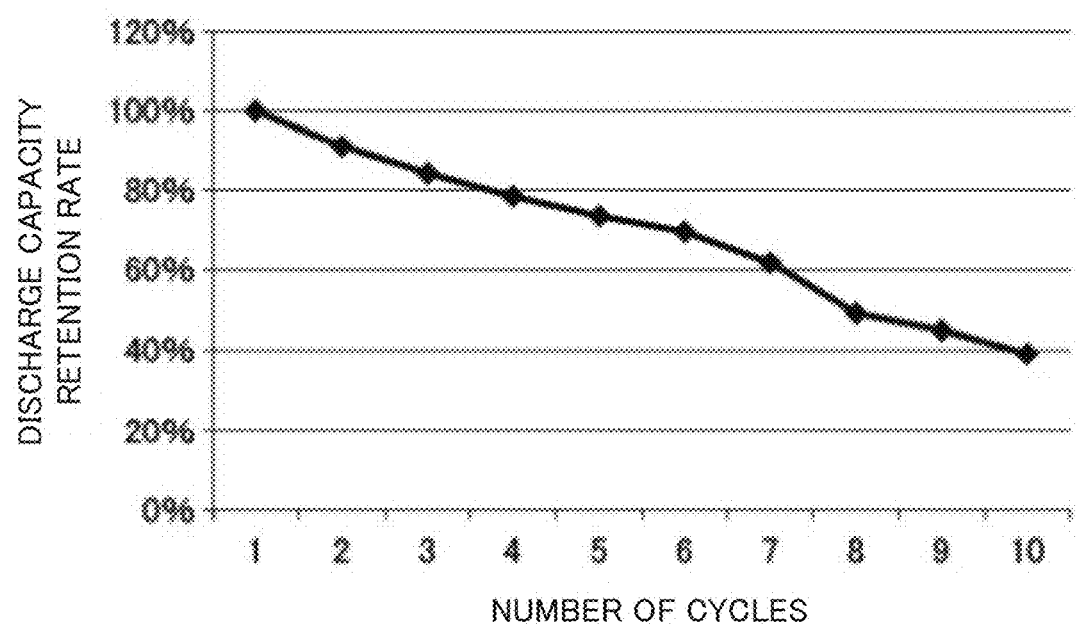
FIG. 10 is a diagram showing changes in charge capacity due to the cycles of a half cell using a composite active material for lithium secondary batteries prepared in Comparative Example 2.

In addition, as shown in FIG. 10, the capacity of this half cell was rapidly deteriorated and greatly declined to 40% of the initial capacity after 10 cycles.

As can be seen from the results, in the embodiment using the composite active material described in Patent Literature 2, the desired effect is not obtained.

Example 3

In order to compare the effect when the composite active material for lithium secondary batteries of the present invention is disposed on the current collector having a three-dimensional structure, lithium secondary batteries using carbon cloth and a copper foil as a current collector were each prepared, and subjected to a charge-discharge test. Hereinbelow, the detail will be described.

(Negative Electrode Production: Carbon Cloth Current Collector)

A generally spherical composite active material for lithium secondary batteries including 70% by mass of graphite and 30% by mass of metal Si was obtained in the same manner as in Example 1. 92 parts by mass of this composite active material, 101 parts by mass of a PVDF containing NMP solution (PVDF (polyvinylidene fluoride) content: 13%), 0.5 part by mass of conductive carbon black, and 47 parts by mass of NMP were weighed, and mixed for 1 minute using a double arm mixer, then the mixture was stirred using a spatula. This operation was carried out twice, thereafter, 459 parts by mass of NMP was further added thereto, and the mixture was mixed for 1 minute using a double arm mixer, then stirred using a spatula. Thereafter, 552 parts by mass of NMP was further added thereto, and the mixture was mixed for 1 minute using a double arm mixer, then stirred using a spatula, to prepare a coating slurry. A carbon cloth (Toray Industries, Inc. TCC-4310) was immersed in the slurry, then pulled out, and the excess slurry was removed by tapping. Thereafter, the carbon cloth was dried to produce a negative electrode.

(Negative Electrode Production: Copper Foil Current Collector)

A generally spherical composite active material for lithium secondary batteries including 70% by mass of graphite and 30% by mass of metal Si was obtained in the same manner as in Example 1. 92 parts by mass of this composite active material, 101 parts by mass of a PVDF containing NMP solution (PVDF (polyvinylidene fluoride) content: 13%), 0.5 part by mass of conductive carbon black, and 47 parts by mass of NMP were weighed, and mixed for 1 minute using a double arm mixer, then the mixture was stirred using a spatula. This operation was carried out twice, thereafter, 507 parts by mass of NMP was further added thereto, and the mixture was mixed for 1 minute using a double arm mixer, then stirred using a spatula, to prepare a coating slurry. This slurry was coated on a copper foil and dried to produce a negative electrode.

(Positive Electrode Production)

84 parts by mass of $LiNi_{1-x-y}Co_xAl_yO_2$, 66 parts by mass of a PVDF containing NMP solution (PVDF (polyvinylidene fluoride) (content: 12%), 8 parts by mass of conductive carbon black, and 29 parts by mass of NMP were weighed, and mixed for 3 minutes using a double arm mixer to prepare a coating slurry. This slurry was coated on an aluminum foil and dried to produce a positive electrode.

(Full Cell Production)

Using the negative electrode and the positive electrode described above as electrodes, a full cell was prepared using a $LiPF_6$ electrolyte with ethylene carbonate:diethyl carbonate=1:3, 1.2 mol/liter, and the following battery evaluation was performed.

(Battery Evaluation: Charge-Discharge Capacity and Cycle Characteristics)

The charge-discharge capacity and cycle characteristics of the obtained composite active material were evaluated using the full cell.

A cycle experiment was performed at a depth of discharge of 100% using a charging and discharging rate of 0.3 C for both charging and discharging, a cut-off voltage at the charging side of 4.1 V, and a cut-off voltage at the discharging side of 2.7 V. The test was performed for 60 cycles, and the capacity retention rate after 60 cycles based on the first cycle was compared. The result thereof is shown in Table 1.

Here, 3 each of the samples using a carbon cloth and a copper foil were prepared, and the measurement was performed.

TABLE 1

| | Negative Electrode | | | | | |
|---|---|---|---|---|---|---|
| | Coating on Carbon Cloth with Slurry | | | Coating on Copper Foil with Slurry | | |
| Sample Number | 1 | 2 | 3 | 1 | 2 | 3 |
| Capacity Retention Rate after 60 Cycles | 90% | 92% | 98% | 85% | 83% | 88% |

In the full cell having a negative electrode in which the composite active material slurry was coated on a carbon cloth, and all capacity retention rates after 60 cycles exceed 90%, and good cycle characteristics were shown. On the other hand, in the full cell having a negative electrode in which the composite active material slurry was coated on a copper foil, the capacity retention rate after 60 cycles fell below 90%. The carbon cloth is a current collector having a three-dimensional structure. The results in Table 1 show that better cycle characteristics can be realized by carrying the composite active material on the current collector having a three-dimensional structure.

The invention claimed is:

1. A method for producing a composite active material for lithium secondary batteries comprising:
   a mixing step of mixing an expanded graphite or a flaky graphite having a specific surface area of 30 $m^2$/g or more and a battery active material capable of combining with lithium ions, to obtain a mixture; and
   a spheroidization step of subjecting the mixture to a spheroidization treatment, to produce a generally spherical composite active material for lithium secondary batteries, the composite active material containing graphite and a battery active material capable of combining with lithium ions.

2. The method for producing a composite active material for lithium secondary batteries according to claim 1, wherein the battery active material capable of combining with lithium ions contains at least one element selected from the group consisting of silicon, tin, aluminum, antimony, and indium.

3. The method for producing a composite active material for lithium secondary batteries according to claim 2, wherein the spheroidization step is perfoimed by a high-speed rotary impact pulverizer selected from the group consisting of hammer mills, pin mills, screen mills, turbo type mills, centrifugal type mills, and sample mills.

4. The method for producing a composite active material for lithium secondary batteries according to claim 1, wherein the spheroidization step is perfoiiiied by a high-speed rotary impact pulverizer selected from the group consisting of hammer mills, pin mills, screen mills, turbo type mills, centrifugal type mills, and sample mills.

5. The method for producing a composite active material for lithium secondary batteries according to claim 1, wherein the battery active material capable of combining with lithium ions has an average particle diameter of 1 μm or less.

6. The method for producing a composite active material for lithium secondary batteries according to claim 1, wherein the area ratio of the graphite exposed to the surface of the composite active material for lithium secondary batteries observed by scanning electron microscope (SEM) observation at an accelerating voltage of 10 kV or less is 95% or more.

7. The method for producing a composite active material for lithium secondary batteries according to claim 1, wherein the expanded graphite or the flaky graphite has a specific surface area of 40 m$^2$/g or more.

\* \* \* \* \*